United States Patent
Matsunaga et al.

(10) Patent No.: US 9,613,661 B2
(45) Date of Patent: Apr. 4, 2017

(54) INFORMATION PROCESSING APPARATUS, RECORDING MEDIUM, AND INFORMATION PROCESSING SYSTEM

(71) Applicant: Sony Corporation, Tokyo (JP)

(72) Inventors: Hideyuki Matsunaga, Tokyo (JP); Kosei Yamashita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 200 days.

(21) Appl. No.: 14/167,534

(22) Filed: Jan. 29, 2014

(65) Prior Publication Data

US 2014/0286621 A1  Sep. 25, 2014

(30) Foreign Application Priority Data

Mar. 22, 2013 (JP) .................. 2013-060061

(51) Int. Cl.
*G11B 27/10* (2006.01)
*G11B 27/28* (2006.01)
*G11B 27/32* (2006.01)
*G06K 9/00* (2006.01)
*G09B 19/00* (2006.01)
*A63B 69/38* (2006.01)

(52) U.S. Cl.
CPC ............ *G11B 27/10* (2013.01); *G06K 9/0055* (2013.01); *G06K 9/00342* (2013.01); *G09B 19/0038* (2013.01); *G11B 27/28* (2013.01); *G11B 27/322* (2013.01); *A63B 69/38* (2013.01)

(58) Field of Classification Search
None
See application file for complete search history.

(56) References Cited

U.S. PATENT DOCUMENTS

| 4,763,284 A | 8/1988 | Carlin |
| 7,739,076 B1 | 6/2010 | Vock et al. |
| 2002/0115046 A1 | 8/2002 | McNitt et al. |
| 2008/0192129 A1* | 8/2008 | Walker ................ G11B 27/034 348/231.2 |
| 2008/0212028 A1* | 9/2008 | Ichikawa ................. A61B 3/14 351/208 |
| 2008/0285990 A1* | 11/2008 | Nishizawa ......... G03G 15/5062 399/49 |
| 2010/0225763 A1 | 9/2010 | Vock et al. |

(Continued)

FOREIGN PATENT DOCUMENTS

| JP | 2003-78864 A | 3/2003 |
| JP | 2005-70392 A | 3/2005 |

OTHER PUBLICATIONS

Extended European Search Report issued Jul. 21, 2014, in European Patent Application No. 14159923.3.

(Continued)

*Primary Examiner* — Eileen Adams
(74) *Attorney, Agent, or Firm* — Oblon, McClelland, Maier & Neustadt, L.L.P.

(57) ABSTRACT

There is provided an information processing that acquires captured image data of a subject; and associates a plurality of time points of the image data and a plurality of time points of event information based on sensor time information, the event information acquired based on sensor information acquired in time series by a sensor apparatus and indicating occurrence of an operation of the sensor apparatus.

23 Claims, 20 Drawing Sheets

(56) References Cited

U.S. PATENT DOCUMENTS

| | | |
|---|---|---|
| 2010/0234769 A1 | 9/2010 | Poliac et al. |
| 2010/0281375 A1* | 11/2010 | Pendergast .......... G11B 27/034 |
| | | 715/723 |
| 2011/0109726 A1* | 5/2011 | Hwang .............. H04N 13/0242 |
| | | 348/47 |
| 2013/0194421 A1* | 8/2013 | Kita ........................ H04N 7/18 |
| | | 348/143 |
| 2014/0058546 A1 | 2/2014 | Vock et al. |
| 2015/0375085 A1* | 12/2015 | Molyneux ........... A43B 1/0054 |
| | | 2/22 |

OTHER PUBLICATIONS

Office Action issued May 12, 2015 in Japanese Patent Application No. 2013-060061.

Office Action issued Jul. 14, 2015 in Japanese Patent Application No. 2013-060061.

\* cited by examiner

INFORMATION PROCESSING APPARATUS, RECORDING MEDIUM, AND INFORMATION PROCESSING SYSTEM

CROSS REFERENCE TO RELATED APPLICATIONS

This application claims the benefit of Japanese Priority Patent Application JP 2013-060061 filed Mar. 22, 2013, the entire contents of which are incorporated herein by reference.

BACKGROUND

The present disclosure relates to an information processing apparatus, a recording medium, and an information processing system.

If a person wishes to improve a skill in sports, it is important to analyze his/her play objectively and be self-improvement conscious in playing sports. In an example of a widely spread way of self-improvement, plays are recorded in still or moving images, and the still or moving images is viewed after the plays, so that a point for improvement or the like is figured out. Such still or moving images are shot by a person other than a user of an imaging apparatus, but are often shot by the user himself/herself, the shot being referred to as so-called a self-shot.

In such a case, for example, if it is possible to extract, from content of the still or moving images, part in which a particular user or a particular play of the user is taken, it is possible to review the play in a short time and thus to figure out the point for improvement. In other words, if a scene desired by the user can be automatically detected from the content, content search efficiency is enhanced. Thus, it is possible to efficiently utilize the content for improving the play.

A technology by which a scene desired by a user is automatically detected in content has already been proposed in commercial content such as a professional sports relay. For example, JP 2011-223287A describes a technology of automatically detecting a scene in which the user is interested (highlight scene) by learning based on a content image or an audio feature amount.

SUMMARY

However, it is not easy to apply the technology as described in JP 2011-223287A to content shot for improving his/her sports skill improvement by the user. According to the aforementioned technology, for example, when content is a football game, a highlight scene is detected based on learning performed by extracting a feature amount of an image showing a line of a field or a trajectory of a ball, or a feature amount of audio representing a whistle or a cheer. However, content shot by the user exhibits various paly sites, and often no whistle and no cheer. Further, the content also includes an obviously unnecessary scene such as a break of a play caused by collecting a ball having flown outside the court. Accordingly, it is difficult and not efficient to learn a feature amount in the same way as for commercial content.

For this reason, there is a demand for a technique of detecting the user's desired scene with high accuracy, for example, in content shot for improving his/her sports skill by the user, by using a technique different from the aforementioned technology. In light of the foregoing, it is desirable to provide an information processing apparatus, a recording medium, and an information processing system which are novel and improved, and which can extract a scene corresponding to the user's sport playing state.

According to an embodiment of the present disclosure, there is provided an information processing system that acquires captured image data of a subject; and associates a plurality of time points of the image data and a plurality of time points of event information based on sensor time information, the event information acquired based on sensor information acquired in time series by a sensor apparatus and indicating occurrence of an operation of the sensor apparatus.

According to the embodiments of the present disclosure described above, it is possible to extract a scene corresponding to the user's sport playing state with higher accuracy.

DETAILED DESCRIPTION OF THE EMBODIMENTS

Figure 1:
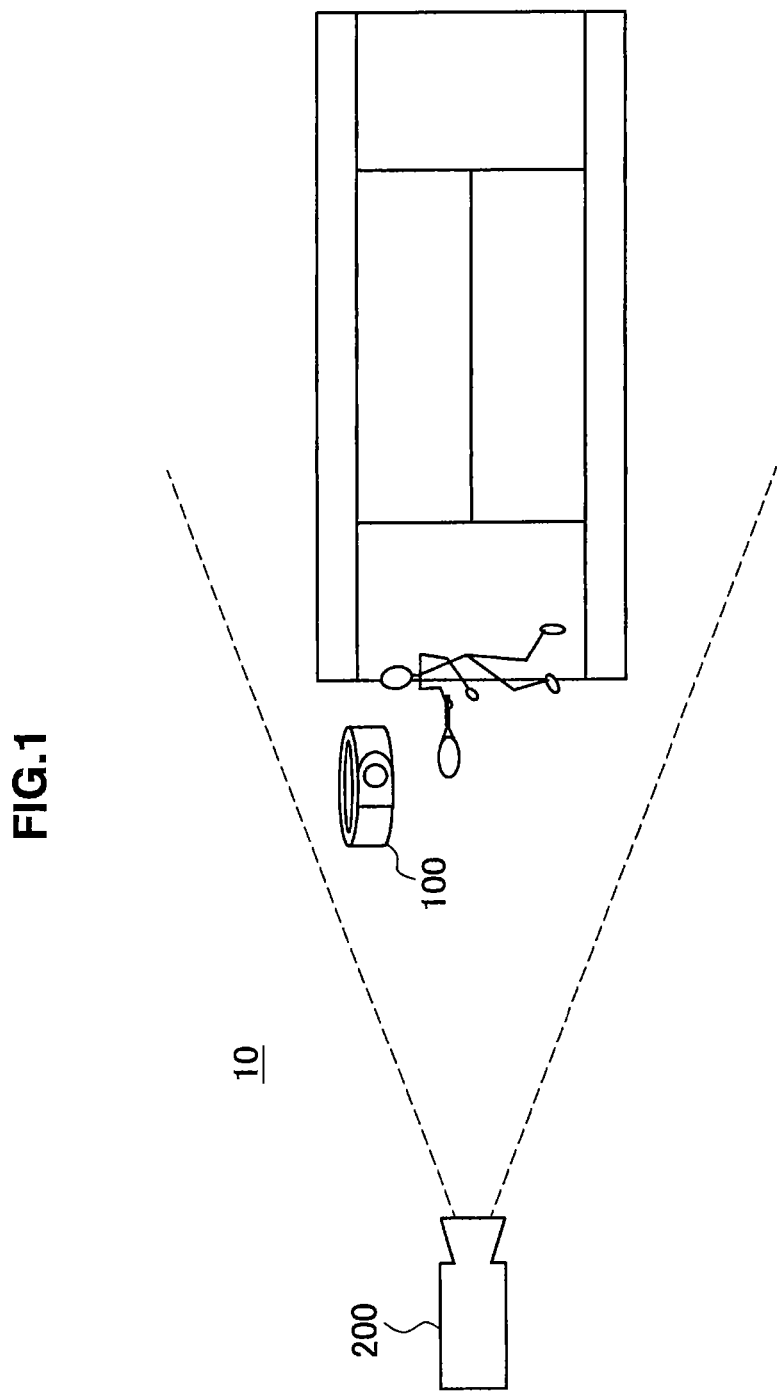
FIG. 1 is a diagram illustrating an outline of an information processing system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The descriptions will be given in the following order.
1. First Embodiment
1-1. System Configuration
1-2. Time Deviation
1-3. Device Configuration
1-4. Time-series Adjustment Processing
2. Second Embodiment
2-1. Functional Configuration
2-2. Time-series Adjustment Processing
3. Third Embodiment
3-1. Functional Configuration
3-2. Time-series Adjustment Processing
3-3. Time-series Adjustment Processing
4. Fourth Embodiment
5. Hardware Configuration
6. Supplementary Explanation

1. First Embodiment

1-1. System Configuration

Firstly, a configuration of an information processing system according to a first embodiment of the present disclosure will be described with reference to FIG. 1.

FIG. 1 is a diagram illustrating an outline of the information processing system according to the first embodiment of the present disclosure. With reference to FIG. 1, an information processing system 10 includes a sensor apparatus 100 and an imaging apparatus 200.

(Sensor Apparatus)

The sensor apparatus 100 is worn by a user playing a sport or is attached to sporting equipment used by the user. When being worn by the user, the sensor apparatus 100 may be shaped, for example, like a bracelet as illustrated in the figure, to be directly attached to the body of the user. When being attached to the sporting equipment (in the case of tennis, such as a racket, tennis wear, shoes, or a list band), the sensor apparatus 100 may be wound around a shaft portion or the like of the equipment, sewed on or attached to fabric, or in advance built in the equipment.

Here, the sensor apparatus 100 acquires sensor information indicating a behavior of the user playing the sport. The behavior of the user indicated by the sensor information can be, for example, a physical motion of the user or the equipment (such as a location, a speed, or acceleration). To acquire such sensor information, for example, the sensor apparatus 100 includes at least one sensor. The sensor detects, for example, acceleration, an angular velocity, vibration, a temperature, a time, or a location (such as a location on the ground expressed by a longitude and a latitude, or a location relative to a court or the like). The sensor apparatus 100 accumulates the sensor information thus acquired, for example. The accumulated sensor information can be transmitted to the imaging apparatus 200 when the user connects the sensor apparatus 100 and the imaging apparatus 200 after the end of the play, for example.

(Imaging Apparatus)

The imaging apparatus 200 captures a play image of a sport. The play image can be a moving image at least partially including the user playing the sport and the sensor apparatus 100 attached to the user or the equipment of the user. The imaging apparatus 200 is placed, for example, in a vicinity of a court where the user plays the sport, and captures the play image. Data of the captured play image is at least temporarily stored in the imaging apparatus 200. Thereafter, for example, when the user connects the sensor apparatus 100 and the imaging apparatus 200 after the end of the play, the imaging apparatus 200 can receive the sensor information acquired by the sensor apparatus 100 while the play image is being taken.

Here, based on the received sensor information, the imaging apparatus 200 detects occurrence of a play event in the sport played by the user and generates play event information corresponding to the play event. For example, the imaging apparatus 200 extracts a scene from the play image based on the play event information and generates a digest image. This enables generation of the digest image including only the scene of the play event designated by the user, for example. In addition, for example, the imaging apparatus 200 sets additional information such as chapter information in the play image, based on the play event information. This facilitates searching for a scene of a desired play event, for example, when the user watches the play image.

Note that the imaging apparatus 200 may upload, to a server not shown in the figure, the play image including, for example, the digest image and the additional information set in the play image. Alternatively, the following configuration may be employed. Specifically, the imaging apparatus 200 uploads a captured play image to the server, and the sensor apparatus 100 also uploads sensor information to the server. The server executes detection of occurrence of a play event, generation of a digest image based on the play event information, and setting of additional information, as described above.

1-2. Time Deviation

Next, a time deviation occurring in the first embodiment of the present disclosure will be described with reference to FIGS. 2 to 5.

(Fixed-Value Deviation)

Figure 2:
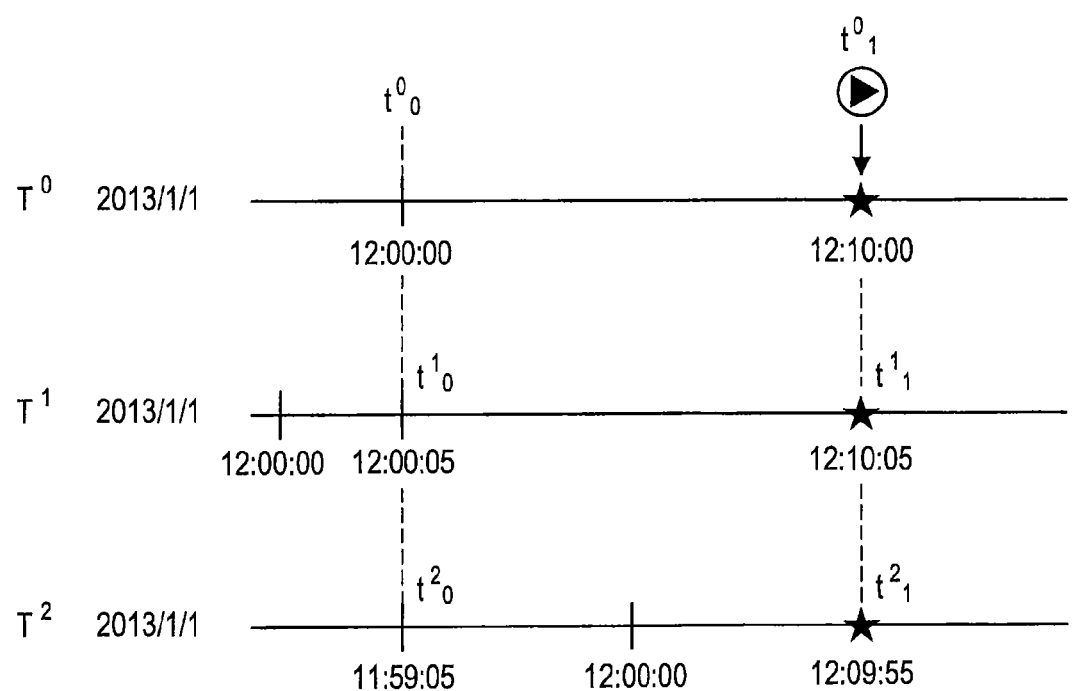
FIG. 2 is a diagram for explaining an example of a time fixed-value deviation possibly occurring in the information processing system according to the first embodiment of the present disclosure.

FIG. 2 is a diagram for explaining a time fixed-value deviation possibly occurring in an example of the information processing system according to the first embodiment of the present disclosure. FIG. 2 illustrates a reference time $T^0$, a time $T^1$ in the sensor apparatus 100, and a time $T^2$ in the imaging apparatus 200. The reference time $T^0$ is a time serving as reference in the real world such as standard time. The time $T^1$ is a time defined by a clock built in the sensor apparatus 100. The time $T^2$ is a time defined by a clock built in the imaging apparatus 200.

As illustrated in the figure, there are constant deviations among the reference time $T^0$, the time $T^1$, and the time $T^2$. For example, when the reference time $T^0$ is at $t^0{}_0=12:00:00$, the time $T^1$ is at $t^1{}_0=12:00:05$ five seconds after the reference time $T^0$, and the time $T^2$ is at $t^2{}_0=11:59:05$ five seconds before the reference time $T^0$. The deviations occur, for example, when initial time setting is performed on each of the sensor apparatus 100 and the imaging apparatus 200. An amount of each deviation remains constant until times are reset, except being influenced by a linear deviation to be described later (in the example illustrated in the figure, the time $T^1$ is five seconds fast, and the time $T^2$ is five seconds slow). Such a time deviation is also referred to as a fixed-value deviation in this specification.

This fixed-value deviation can cause a deviation between a time stamp of sensor information acquired by the sensor apparatus 100 and a time stamp of a play image captured by the imaging apparatus 200. In the example in FIG. 2, when the reference time $T^0$ is at $t^0{}_1=12:10:00$, the imaging apparatus 200 starts capturing a play image. At this time, the time $T^1$ in the sensor apparatus 100 is at $t^1{}_1=12:10:05$, and the time $T^2$ in the imaging apparatus 200 is at $t^2{}_1=12:09:55$. Accordingly, while the play image is being captured, a ten second deviation remains between the time $T^1$ in the sensor apparatus 100 and the time $T^2$ in the imaging apparatus 200.

Figure 3:
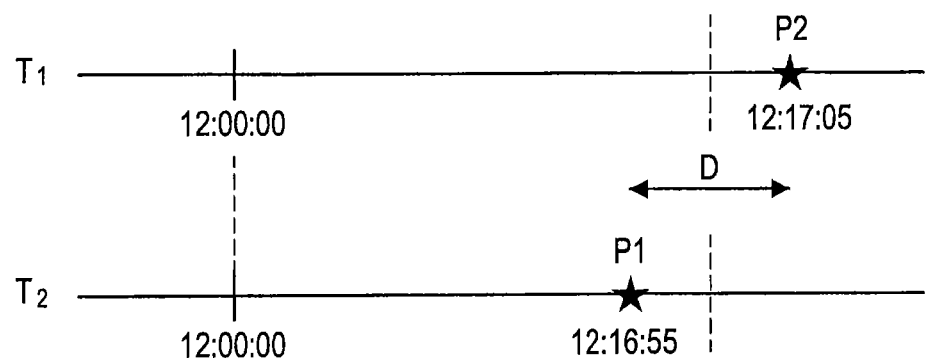
FIG. 3 is a diagram for explaining a time-stamp deviation between a play event and a play image in a state where there occurs such a fixed-value deviation as in the example in FIG. 2.

FIG. 3 is a diagram for explaining a time-stamp deviation between a play event and a play image in a state where there occurs such a fixed-value deviation as in the example in FIG. 2. FIG. 3 illustrates a time stamp difference between the sensor apparatus 100 and the imaging apparatus 200 in the following case. After a play image is captured, the imaging apparatus 200 generates play event information based on sensor information received from the sensor apparatus 100, and associates the play event information with the play image.

Since the play event information is generated based on the sensor information acquired by the sensor apparatus 100, a time stamp at occurrence of a play event indicated by the play event information is a time stamp based on the time $T^1$ in the sensor apparatus 100. On the other hand, the play image is captured by the imaging apparatus 200, and thus the time stamp of the play image is a time stamp based on the time $T^2$ in the imaging apparatus 200. Here, as described above, the ten second deviation remains between the time $T^1$ and the time $T^2$ while the play images is being captured.

However, when the play event information is associated with the play image, only one way to identify which section of the play image corresponds to the play event indicated by the play event information is to perform matching between the play event information and the play image based on their respective time stamps. Here, for example, suppose a case where the play event occurs at a time (12:17:00 in the reference time $T^0$) corresponding to 12:17:05 in the time $T^1$ and 12:16:55 in the time $T^2$, as illustrated in FIG. 3. Although the play event is taken at a time stamp of 12:16:55 (P1) in the play image, the play event information indicates that the play event occurs at a time stamp (P2) of 12:17:05, for the above reason. Accordingly, for example, when a digest image is generated by extracting a scene from the play image based on the play event information, a scene ten seconds after the actual occurrence of the play event is extracted as the scene of the play event. The delay is denoted with reference letter D in the figure.

Here, for example, in a case where a scene of a play image is extracted by searching or the like utilizing a digest image or chapter information and then is reproduced, a time deviation which the user can accept without unnatural feeling is not so large and is, for example, up to approximately 0.1 second. In addition, some types of play events often have a short duration of approximately several seconds. Accordingly, for example, the occurrence of the deviation equivalent to no less than ten seconds as in the aforementioned example not only causes the user to feel unnatural but also might lead to useless reproduction of a scene of a play event.

Hence, in the present embodiment, the time $T^1$ in the sensor apparatus 100 is recorded in a play image in a certain form as to be described later. When sensor information is later transmitted to the imaging apparatus 200, an adjustment is made between a time series of play event information generated based on the sensor information by the imaging apparatus 200 and a time series of a play image. It is thereby possible to synchronize timing of play event occurrence indicated by the play event information with timing of taking the play event in the play image.

(Linear Deviation)

Figure 4:
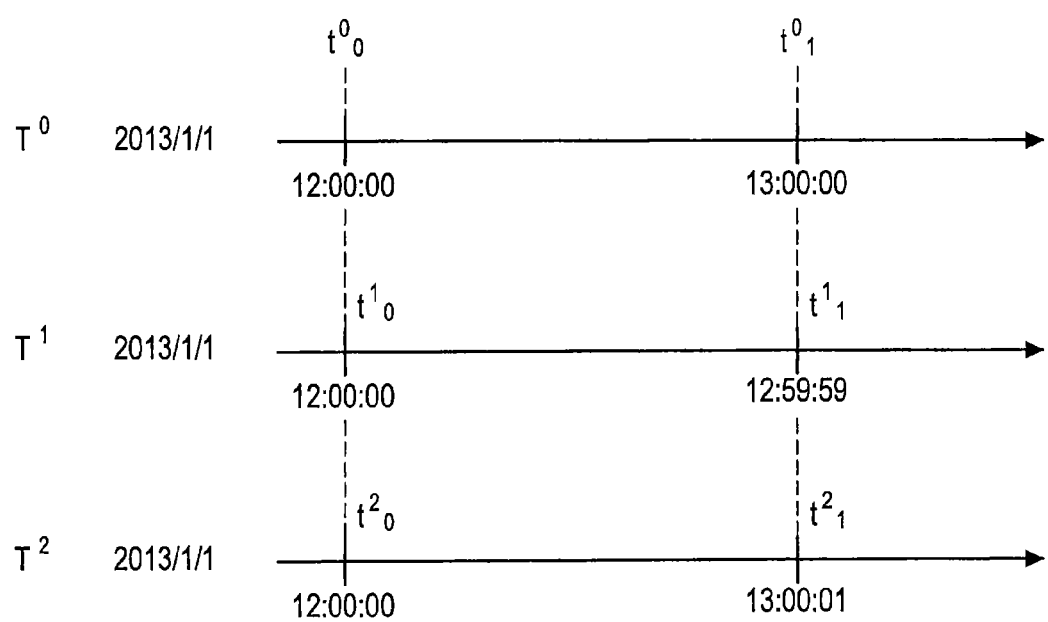
FIG. 4 is a diagram for explaining an example of a time linear deviation possibly occurring in the information processing system according to the first embodiment of the present disclosure.

FIG. 4 is a diagram for explaining an example of a time linear deviation possibly occurring in the information processing system according to the first embodiment of the present disclosure. Like FIG. 2 described above, FIG. 4 illustrates the reference time $T^0$, the time $T^1$ in the sensor apparatus 100, and the time $T^2$ in the imaging apparatus 200.

In the example illustrated in the figure, the reference time $T^0$, the time $T^1$, and the time $T^2$ synchronize with one another at a time point when the reference time $T^0$ is at $t^0{}_0=12:00:00$, that is, at time $t^1{}_0=12:00:00$ and at time $t^2{}_0=12:00:00$. However, as time elapses, deviations occur among the times. More specifically, at a time point when the reference time $T^0$ is at $t^0{}_1=13:00:00$, the time $T^1$ is at $t^1{}_1=12:59:59$ and is one second slower than the reference time $T^0$. Also at the same time point, the time $T^2$ is at $t^2{}_1=13:00:01$, and is one second faster than the reference time $T^0$. Such a deviation is caused, for example, by an oscillation frequency error of a crystal oscillator used for a clock built in each of the sensor apparatus 100 and the imaging apparatus 200. When a voltage is applied to the crystal oscillator, the crystal oscillator oscillates at an almost constant oscillation frequency. However, the oscillation frequency has an error of for example, up to approximately 150 ppm (parts per million) with respect to an originally specified oscillation frequency due to an individual difference of a crystal, an ambient temperature, or the like.

Such an error can cause a time defined by a clock using a crystal resonator to deviate from a standard time by up to approximately one second per hour. In the example in FIG. 4, it is conceived that such deviations as illustrated in the figure occur for the following reason: the oscillation frequency of a crystal oscillator used for the clock of the sensor apparatus 100 defining the time $T^1$ is slightly lower than an originally defined oscillation frequency; and the oscillation frequency of a crystal oscillator used for the clock of the imaging apparatus 200 defining the time $T^2$ is slightly higher than the originally defined oscillation frequency. The oscillation frequency of each crystal oscillator is temporally constant. Accordingly, unless the ambient temperature changes drastically, an amount of the deviation between the time $T^1$ and the time $T^2$ is increased with the elapse of time. Such a time deviation is also referred to as a linear deviation in this specification.

(Deviation Adjustment Method)

Figure 5:
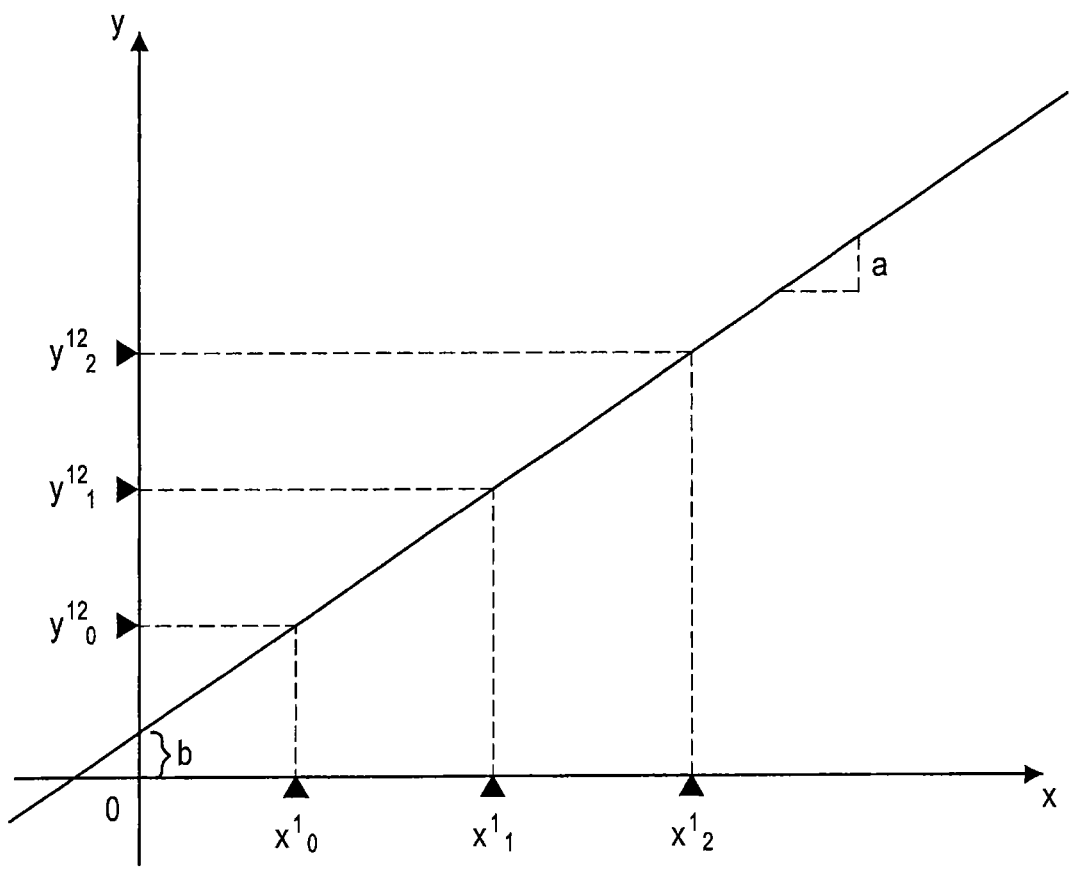
FIG. 5 is a diagram for explaining a method for adjusting a time deviation in the first embodiment of the present disclosure.

FIG. 5 is a diagram for explaining a method for adjusting a time deviation in the first embodiment of the present disclosure. As has heretofore been described, two types of time deviations which are the fixed-value deviation and the linear deviation can occur between the time $T^1$ in the sensor apparatus 100 and the time $T^2$ in the imaging apparatus 200 which are included in the information processing system 10 according to the present embodiment. FIG. 5 illustrates a model of time deviations caused by a combination of the fixed-value deviation and the linear deviation. Note that in the model illustrated in the figure, an x axis represents a time in the sensor apparatus 100, while a y axis represents a time in the imaging apparatus 200. A relation between a time x in the sensor apparatus 100 and a time y in the imaging apparatus 200 is expressed as y=ax+b.

Here, "a" represents a linear deviation between the time x and the time y. As in the example in FIG. 4 described above, in the case where a linear deviation occurs because the time y in the imaging apparatus 200 elapses faster than the time x in the sensor apparatus 100, the time x has a higher change ratio per hour than the time y, and thus a relation a>1 holds true. On the contrary, in the case where a linear deviation occurs because the time y in the imaging apparatus 200 elapses slower than the time x in the sensor apparatus 100, the time x has a lower change ratio per hour than the time y, and thus a relation a<1 holds true as in the example in FIG. 5. In the case where a linear deviation does not occur between the time x and the time y, a relation a=1 holds true.

In contrast, "b" represents a fixed-value deviation between the time x and the time y. As in the example in FIG. 2, in the case where the time y in the imaging apparatus 200 elapses slower than the time x in the sensor apparatus 100, a relation b<0 holds true. This is because when the time x reaches a certain time (in the example in FIG. 5, x=0), the time y has not reached the certain time yet. On the contrary, in the case where the time y in the imaging apparatus 200 elapses faster than the time x in the sensor apparatus 100, a relation b>0 holds true as in the example in FIG. 5. This is because when the time x reaches a certain time, the time y reaches a time point after the certain time. In the case where a fixed-value deviation does not occur between the time x and the time y, a relation b=0 holds true.

Accordingly, if values of a and b are specified, a time stamp group $X^1$ which is an element of a set $\{x^1_0, x^1_1, \ldots, x^1_n\}$ of play event information provided based on the time x in the sensor apparatus 100 can be converted into a time stamp group $Y^{12}$ which is an element of a set $\{y^{12}_0, y^{12}_1, \ldots, y^{12}_n\}$ of a play image provided based on the time y in the imaging apparatus 200, with the fixed-value deviation and the linear deviation taken into consideration as illustrated in FIG. 5.

In the present embodiment, the time x in the sensor apparatus 100 recorded in a certain form is recorded in a play image, the time x is compared with the time y in the imaging apparatus 200, i.e., a time stamp of a play image at a time point when the time x is recorded, and thereby the values of a and b described above are specified. This enables conversion of a time stamp group of play event information into a time stamp group of a play image in the imaging apparatus 200, when sensor information is later transmitted to the imaging apparatus 200. Note that processing of recording the time x in the play image and processing of specifying the values of a and b will be described later in detail.

1-3. Device Configuration

Next, functional configurations of apparatuses included in the information processing system according to the first embodiment of the present disclosure will be described with reference to FIG. 6.

Figure 6:
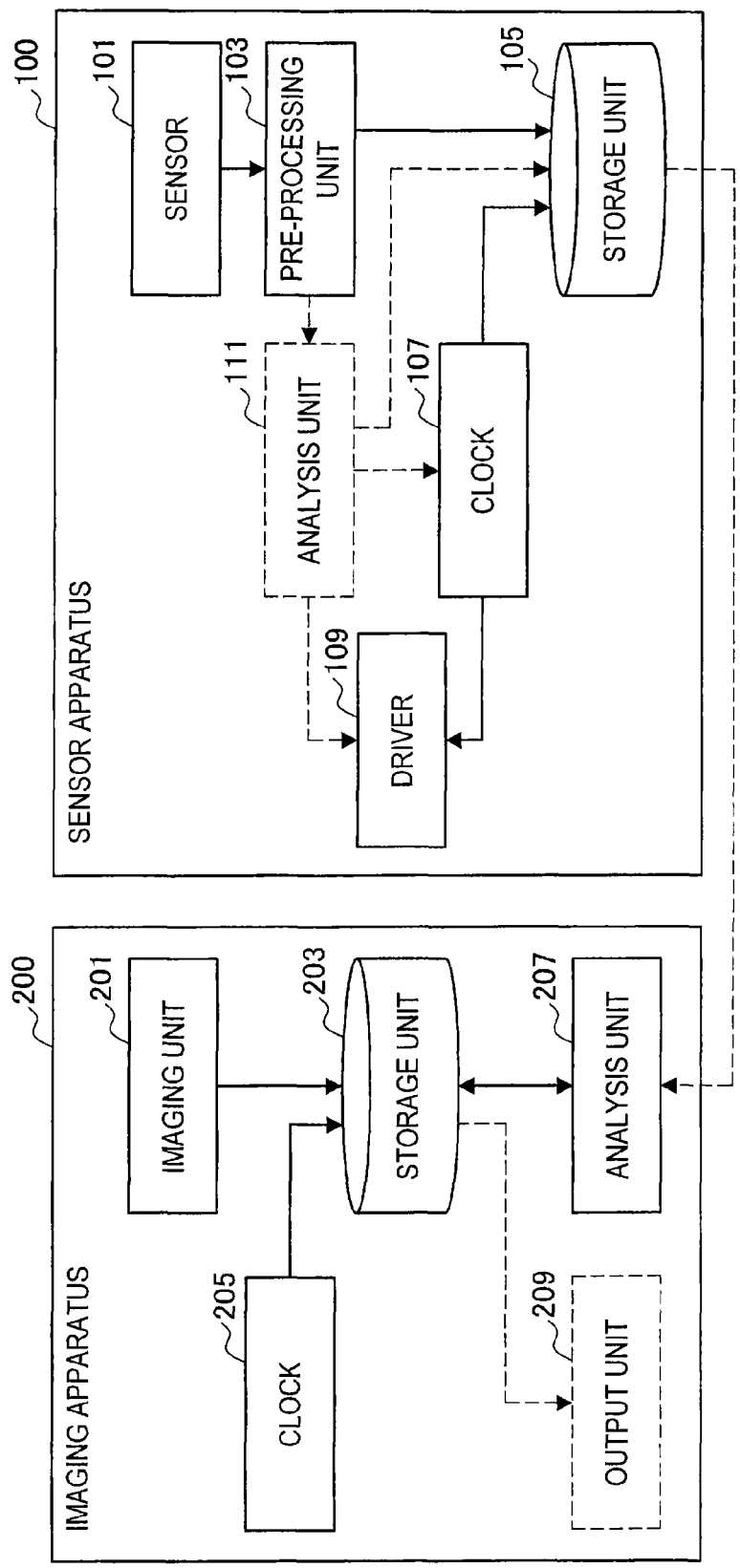
FIG. 6 is a block diagram illustrating a schematic functional configuration of a sensor apparatus and an imaging apparatus according to the first embodiment of the present disclosure.

FIG. 6 is a block diagram illustrating a schematic functional configuration of the sensor apparatus and the imaging apparatus according to the first embodiment of the present disclosure. Hereinafter, the functional configuration of each apparatus will be described with reference to FIG. 6. Note that a hardware configuration for implementing the functions will be described later.

(Sensor apparatus)

The sensor apparatus 100 includes a sensor 101, a pre-processing unit 103, a storage unit 105, a clock 107, and a driver 109. The sensor apparatus 100 may further include an analysis unit 111 in a modification to be described later.

The sensor 101 detects, for example, acceleration, an angular velocity, vibration, a temperature, a time, or a location. More specifically, the sensor 101 may include, for example, an acceleration sensor, an angular velocity sensor, a vibration sensor, a temperature sensor, a pressure sensor (including a press switch), or a GPS (Global Positioning System) receiver.

The pre-processing unit 103 executes pre-processing of data detected by the sensor 101. The pre-processing can be, for example, amplifying the detected data, or filtering out data having a value equal to or lower than a threshold. Note that data might be supplied to the storage unit 105 without necessarily passing through the pre-processing unit 103, depending on the type of the sensor 101.

The storage unit 105 temporarily stores therein, as sensor information, data detected by the sensor 101 and processed as necessary by the pre-processing unit 103. At this time, the sensor information is stored together with a time stamp provided by the clock 107.

Here, the sensor information stored in the storage unit 105 is later transmitted to the imaging apparatus 200 through a communication unit not shown in the figure. In the present embodiment, the sensor information is not transmitted in real time to the imaging apparatus 200 by the sensor apparatus 100 when being generated, but transmitted later. This holds true for a case where, for example, the sensor apparatus 100 does not include a communication device for wireless communication for making the device smaller or lighter or for reducing power consumption, or a case where the sensor apparatus 100 includes the communication device but does not frequently execute communication while acquiring sensor information.

The clock 107 defines a time used in the sensor apparatus 100. The clock 107 defines the time based on, for example, an initially set time and an oscillation frequency of a crystal resonator. As described above, a deviation due to initial time setting might cause a fixed-value deviation between: the reference time or a time in another apparatus such as the imaging apparatus 200; and a time in the sensor apparatus 100 defined by the clock 107. In addition, an error of the oscillation frequency of the crystal resonator might cause a linear deviation.

The driver 109 drives an output device configured to indicate a time in the sensor apparatus 100 by using light or sound, the output device including a lamp such as an LED (Light Emitted Diode), a display such as an LCD (Liquid Crystal Display), a speaker, and the like. For example, when the clock 107 reaches a predetermined time, the driver 109 drives the output device to use a pattern which is predetermined for indicating the time. For example, the driver 109 lights up a lamp in a predetermined color or a pattern, displays characters or a code indicating the time on the display, or causes the speaker to sound at a predetermined oscillation frequency or in a predetermined oscillation pattern.

(Imaging Apparatus)

The imaging apparatus 200 includes an imaging unit 201, a storage unit 203, a clock 205, and an analysis unit 207. The imaging apparatus 200 may further include an output unit 209.

The imaging unit 201 includes imaging devices and a lens for capturing images, drive circuits therefor, and the like. The imaging unit 201 captures an image of the user who plays a sport with the sensor apparatus 100 worn by the user or with equipment to which the sensor apparatus 100 is attached. This image is a play image mentioned above. Accordingly, the play image shows not only the user who is a subject but also the sensor apparatus 100 directly or indirectly worn by the user.

The storage unit 203 temporarily or continuously stores therein data of the play image captured by the imaging unit 201. At this time, the data of the play image is stored together with a time stamp provided by the clock 205. The data of the play image can be provided to the analysis unit 207 for identifying a scene corresponding to a play event, when sensor information is later received from the sensor apparatus 100 through the not shown communication unit. The storage unit 203 may also store therein a digest image generated while a result of an analysis by the analysis unit 207 is reflected thereon, or again store a play image including additional information such as a chapter image.

The clock 205 defines a time used in the imaging apparatus 200. The clock 205 defines the time based on, for example, an initially set time and an oscillation frequency of a crystal resonator. As described above, a deviation due to initial time setting might cause a fixed-value deviation between: the reference time or a time in another apparatus such as the sensor apparatus 100; and a time in the imaging apparatus 200 defined by the clock 205. In addition, an error of the oscillation frequency of the crystal resonator might cause a linear deviation.

After the play image is captured, the analysis unit 207 analyzes the sensor information received from the sensor apparatus 100 through the not shown communication unit, thereby detects occurrence of a play event in the sport played by the user who is a subject of the imaging unit 201, and generates play event information corresponding to the play event. Further, based on information indicating a time in the sensor apparatus 100 at at least one time point in capturing the play image, the analysis unit 207 makes an adjustment between a time series of the play event information and the time series of the play image, and thereby accurately identifies a scene in the play image corresponding to the play event identified by the play event information. The analysis unit 207 may extract one or more scenes from the play image based on an analysis result to generate a digest image only including one or more scenes of a designated play event. The analysis unit 207 may also set, in the play image, additional information such as chapter information corresponding to a play event, based on an analysis result. Alternatively, the analysis unit 207 may also store an analysis result as data separate from the play image in the storage unit 203.

Here, a play event is defined as a unit of an action having a certain meaning in a play in sports. For example, in the case of tennis, it is possible to define such play events as "swinging", "jumping", "hitting a ball", and "moving inside the court". The analysis unit 207 analyzes sensor information by using machine learning or pattern recognition and thereby detects occurrence of a play event defined in advance. Further, the analysis unit 207 generates play event information while adding thereto detailed information on the play event of which occurrence is detected, for example, by further referring to the sensor information as necessary. The play event information can include time stamp information, for example, as a start time and an end time of the play event.

Table 1 below shows an example of definition of play events. The play events may be defined in this way by sport or by type. The play events of the same type may be classified more particularly. Note that the play events shown here are examples, and various types of play events in other various sports can be defined.

TABLE 1

Play event examples

| Sports | Event type | Event details |
| --- | --- | --- |
| Tennis | Swing | Forehand stroke |
|  |  | Forehand volley |
|  |  | Forehand slice |
|  |  | Backhand stroke |
|  |  | Backhand volley |
|  |  | Backhand slice |
|  |  | Overhead |
|  |  | Serve |
| Baseball | Swing | Upswing |
|  |  | Level swing |
|  |  | Downswing |
|  |  | Bunt |
| Football | Shoot | Shoot |
|  |  | Loop shoot |
|  |  | Drive shoot |
|  |  | Volley shot |
|  |  | Overhead shot |
| Table tennis | Swing | Forehand |
|  |  | Forehand cut |
|  |  | Forehand drive |
|  |  | Backhand |
|  |  | Backhand cut |
|  |  | Backhand drive |
|  |  | Serve |

As described above, a time stamp of play event information is based on a time stamp of sensor information provided based on the clock 107 of the sensor apparatus 100, and thus might have a deviation from a time stamp of a play image. Hence, the analysis unit 207 executes processing for time stamp adjustment to be described later.

The output unit 209 outputs data of play images and the like stored in the storage unit 203. The output unit 209 may include a display configured to display images, a speaker configured to output audio, or the like, and may reproduce a play image, a digest image generated based on a play image, and the like. Alternatively, the output unit 209 may include a server on a network or a communication device configured to communicate with another device owned by the user, and may transmit a play image, a digest image, or the like to the server or the other device.

(Modification)

In a modification of the present embodiment, the sensor apparatus 100 may include the analysis unit 111, and the analysis unit 111 may execute the play-event-information generation processing executed by the analysis unit 207 of the imaging apparatus 200 in the example described above. In this case, the storage unit 105 stores therein the play event information instead of or together with sensor information, and the play event information is later transmitted to the imaging apparatus 200 through the not shown communication unit. Also in this case, when occurrence of a play event is detected based on the sensor information, the analysis unit 111 may notify the clock 107 or the driver 109 of the occurrence of the play event. This notification enables the driver 109 to cause the output device to indicate a time in the sensor apparatus 100 at timing of detecting the occurrence of the play event. Such a configuration is useful, for example, in a case where a play image has such a short image capturing duration that the image capturing duration might not include a predetermined time at which the driver 109 causes the time to be indicated. Alternatively, the driver 109 may cause the output device to indicate a time in the sensor apparatus 100, at timing of detecting: instruction manipulation by the user (such as turning on the sensor apparatus 100, pressing a button provided on the sensor apparatus 100, or the like) using a separately provided manipulation unit; or an unordinary play event (such as repeatedly rotating equipment to which the sensor apparatus 100 is attached, tapping the equipment a predetermined number of times, or the like).

1-4. Time-Series Adjustment Processing

Next, time-series adjustment processing in the first embodiment of the present disclosure will be described with reference to FIGS. 7 to 10.

(Indicating Time in Sensor Apparatus)

Figure 7:
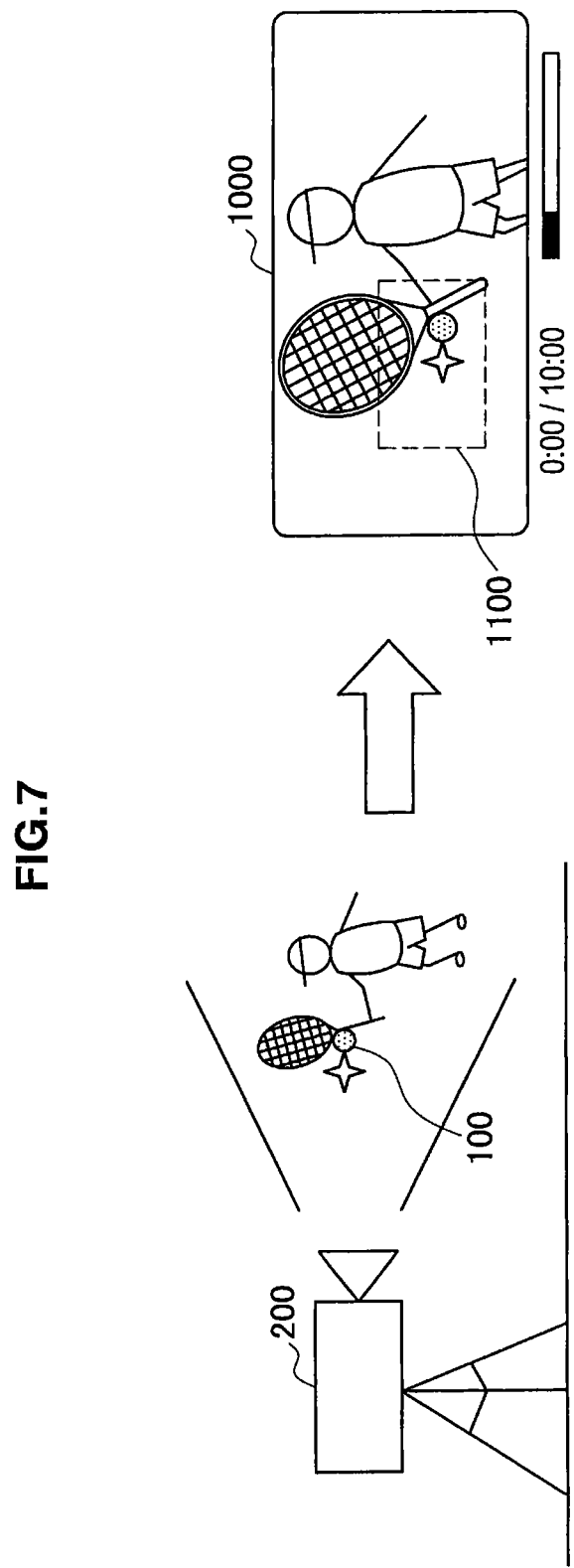
FIG. 7 is a diagram for explaining an example of indicating a time by the sensor apparatus in the first embodiment of the present disclosure.

FIG. 7 is a diagram for explaining an example of indicating a time by the sensor apparatus in the first embodiment of the present disclosure. As illustrated in FIG. 7, when the imaging apparatus 200 captures an image of the user playing a sport, the image (play image) includes not only the user who is a subject but also the sensor apparatus 100 worn directly or indirectly by the user. Here, as described above, the driver 109 drives the output device, and thereby the sensor apparatus 100 indicates the time in the sensor apparatus 100 by using light, sound, or the like. In the example illustrated in the figure, the sensor apparatus 100 indicates a time by light of a lamp, and thus a captured play image 1000 includes an image 1100 indicating a time based on the sensor apparatus 100.

As described above, the sensor apparatus 100 indicates a time, for example, by lighting up the lamp in a predetermined pattern. In this case, the pattern lasts for a predetermined time period, and thus the image 1100 can be recognized as not a single frame image in a moving image but as a series of frame images while the pattern lasts. Alternatively, when the sensor apparatus 100 indicates a time by using a color of the lamp or characters or a pattern displayed on the display, the image 1100 may be a single frame image. When the sensor apparatus 100 indicates a time by using audio, not the image 1100 but audio data in a predetermined section of the moving image can be recognized as information for indicating a time in the sensor apparatus 100.

Figure 8:
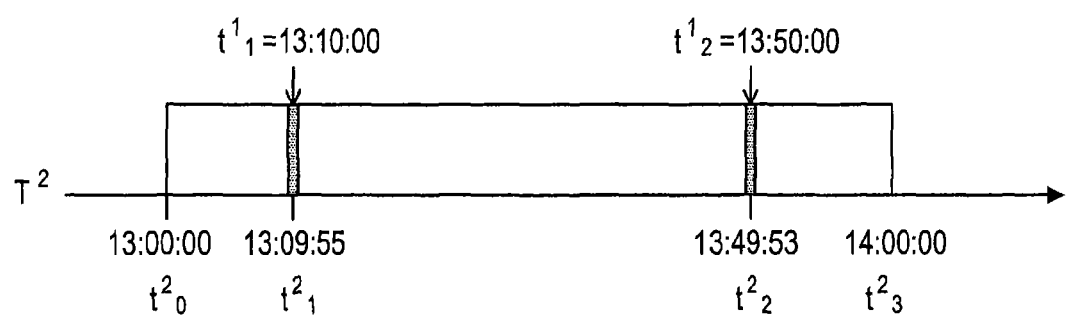
FIG. 8 is a diagram for explaining an example in which the sensor apparatus acquires a time in the first embodiment of the present disclosure.

FIG. 8 is a diagram for explaining an example in which the sensor apparatus acquires a time in the first embodiment of the present disclosure. The example in FIG. 8 shows that, in the imaging apparatus 200, capturing of a play image is started at a time point when the time $T^2$ is at $t^2_0$=13:00:00, and the capturing of the play image is terminated at a time point of $t^2_3$=14:00:00. Accordingly, a time stamp of the play image starts at 13:00:00 and ends at 14:00:00. Meanwhile, the sensor apparatus 100 indicates times by using respective images (by lighting up the lamp, by using an indicator on the display, or the like) or audio (sound at a predetermined frequency, in a predetermined pattern, or the like), and the images or the audio is recorded in the play image at $t^2_1$=13:09:55 and at $t^2_2$=13:49:53 of the time stamp (time $T^2$).

The analysis unit 207 of the imaging apparatus 200 analyzes the images or the audio based on correspondence with, for example, a pattern, a code, or a frequency each of which is predetermined. Consequently, it is found that the image or the audio recorded at $t^2_1$=13:09:55 indicates the time of $t^1_1$=13:10:00 in the sensor apparatus 100, and the image or the audio recorded at $t^2_2$=13:49:53 likewise indicates the time of $t^1_2$=13:50:00 in the sensor apparatus 100. Based on the information, the analysis unit 207 can calculate parameters for making an adjustment between a time series of sensor information and a time series of a play image (hereinafter, also referred to as time-series adjustment parameters), the parameters being the values of a and b, for example, in the aforementioned model in FIG. 5. The values of a and b can be calculated by solving a linear equation with two unknowns for a and b which is obtained by substituting values of x and y in an equation y=ax+b.

For example, in the example in FIG. 8, calculation of a and b results in a=0.99 and b=−5, where a time 0 (seconds) is set for $t^1_1$=13:10:00, and other times are expressed by using seconds based on a difference from the time $t^2_1$ ($t^2_1$=−5, $t^1_2$=2400, and $t^2_2$=2953) (the numbers are here truncated to two decimal places for simplicity, but can actually be calculated to more decimal places). From this result, it is found that: at the time point of $t^1_1$=13:10:00, the time $T^2$ in the imaging apparatus 200 has a fixed-value deviation of minus five seconds from the time $T^1$ in the sensor apparatus 100; 0.99 seconds elapses in the time $T^2$ while one second elapses in the time $T^1$; and thus a linear deviation equivalent to the difference therebetween is incremented (that is, the time $T^2$ lags behind the time $T^1$ little by little).

The analysis unit 207 of the imaging apparatus 200 can make an adjustment between a time series of sensor information and a time series of a play image based on the parameters thus calculated. Here, it should be noted that the reference time $T^0$ as illustrated in FIG. 2 does not necessarily have to be referred to when the parameters are calculated. In the present embodiment, it suffices that a relative adjustment is made between a time series of sensor information and a time series of a play image, and thus it is not necessary to necessarily provide information indicating what reference time corresponds to a time in the sensor information or a time stamp of a play image.

(Processing Flow)

Figure 9:
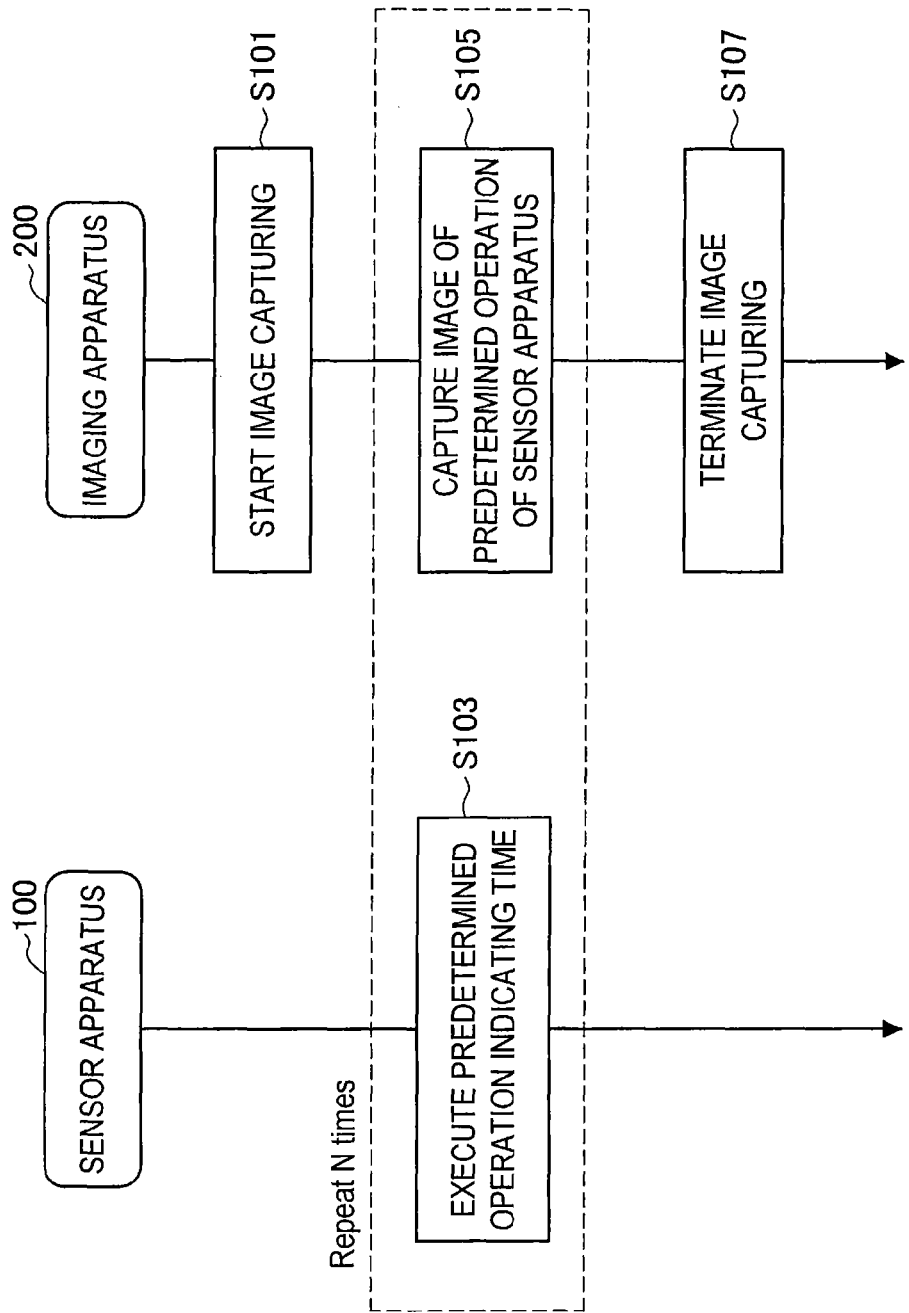
FIG. 9 is a flowchart illustrating an example of processing at the time of image capturing in the first embodiment of the present disclosure.

FIG. 9 is a flowchart illustrating an example of processing at the time of image capturing in the first embodiment of the present disclosure. In the example in FIG. 9, the imaging unit 201 of the imaging apparatus 200 firstly starts capturing a play image (Step S101). The captured play image is accumulated in the storage unit 203 together with a time stamp based on a time defined by the clock 205 of the imaging apparatus 200.

In the present embodiment, the imaging apparatus 200 does not transmit a notification to the sensor apparatus 100 at a time point of starting capturing a play image. However, in another embodiment, a notification step may be executed together with Step S101. In the notification step, the imaging apparatus 200 notifies the sensor apparatus 100 of start of the play image capturing, for example, through wireless communication. In this case, the sensor apparatus 100 can execute a predetermined operation of indicating a time to be performed in Step S103 to be described later, only while the imaging apparatus 200 is being capturing the play image. Thus, it is possible to prevent an unnecessary operation performed while the play image is not being captured, and thus, for example, to reduce power consumption in the sensor apparatus 100.

Next, while the play image is being captured, the sensor apparatus 100 executes the predetermined operation of indicating a time defined by the clock 107 of the sensor apparatus 100 (Step S103). As described above, this operation may be, for example, lighting up the lamp in a predetermined color or a predetermined pattern, displaying predetermined characters or a code on the display, or causing the speaker to sound at a predetermined oscillation frequency or in a predetermined oscillation pattern.

At this time, the imaging apparatus 200 is capturing an image of the predetermined operation executed by the sensor apparatus 100 as well as the user who is the subject (Step S105). Note that the image capturing mentioned here includes recording not only an image but also audio. In this step, the predetermined operation executed by the sensor apparatus 100 is recorded as an image or audio in the play image, the predetermined operation indicating a time defined by the clock 107 of the sensor apparatus 100.

After Steps S103 and S105 described above are repeated a predetermined number of times (N times; N=1, 2, 3, . . . ), the imaging apparatus 200 terminates the play image capturing (Step S107). Note that N is 2 in the example in FIG. 8 described above, but may be 1, or 3 or more.

Meanwhile, for example, when the aforementioned model in FIG. 5 is used, N=1 leads to one equation obtained by substituting values of x and y into the equation y=ax+b, so that it is not possible to calculate both the values of a and b. However, for example, in a case where the play image has a short duration, where a slight time deviation is permissible due to the nature of the play event, or a similar case, it is possible to consider that there is no linear deviation (a=1). In such a case, N=1 and calculating only a fixed-value deviation (value of b) can also identify a scene of a play event in the play image with sufficient accuracy.

On the other hand, for example, when the aforementioned model in FIG. 5 is likewise used, N≥3 leads to a larger number of obtained equations than the number of unknowns (a and b). In such a case, when all the equations are made simultaneous, it is not generally possible to obtain a solution. However, for example, the following method may be employed. Specifically, a linear equation with two unknowns is generated for each adjacent two points based on a combination of values of (x and y). Then, values of the fixed-value deviation and the linear deviation to be applied to the corresponding section between the aforementioned two points are determined based on values of a and b obtained as a solution of the equation. In addition, the thus obtained values of the time deviations of the sections may be averaged based on a predetermined number of sections, and an averaged value may be used. As described above, the magnitude of the linear deviation also varies with the ambient temperature of the sensor apparatus 100. Accordingly, for example, when the play image lasts for a long time, or when the play image is captured outside and thus is considerably influenced by variation of sunshine, calculating the value of the linear deviation for each section of the play image could enhance the accuracy of the time-series adjustment as a whole.

The numbers of times of executing Steps S103 and S105 described above may differ from each other. More specifically, the number of times of executing Step S105 may be smaller than that of Step S103. This means that part of operations executed by the sensor apparatus 100 is not recorded in the play image captured by the imaging apparatus 200.

The sensor apparatus 100 is worn directly or indirectly by the user playing the sport, and thus might be hidden behind the body of the user or the equipment when viewed from the imaging apparatus 200, depending on the action of the user, for example. In such a case, for example, light emitted from the lamp or an indicator of the display of the sensor apparatus 100 is not recorded in the play image. Moreover, if the user moves vigorously when the light is emitted from the lamp or the indicator is displayed on the display of the sensor apparatus 100, a blur might occur in the image. Thus, the light emission from the lamp or the indicator on the display might not be recorded clearly.

Further, the user might not necessarily play the sport alone, and sound might be generated depending on the play of the sport. Thus, for example, a conversation between the user and another user (or a monologue of the user) or noise such as a ball hitting sound or a footstep generated in the play might prevent clear recording of audio outputted from the speaker of the sensor apparatus 100.

In this case, for example, even though Step S103 is executed five times, the recording of the predetermined operation of the sensor apparatus 100 in the play image might fail two times, because the sensor apparatus 100 is hidden behind the body of the user or the equipment, the user moves vigorously, or noise is generated in the audio. Consequently, Step S105 might be executed only three times. Even in such a case, if Step S105 is executed at least one time as a result, the time-series adjustment can be performed.

For example, the frequency at which the sensor apparatus 100 executes Step S103 may be set in consideration of the aforementioned circumstances. For example, suppose a case where the play image has a duration of 30 minutes on average, the number of times of executing Step S105 necessary for the time-series adjustment processing is at least 2, and the imaging apparatus 200 records the predetermined operation of the sensor apparatus 100 at a probability of 50%. In this case, the sensor apparatus 100 can be set to execute the predetermined operation in Step S103 every three minutes. This means that the operation in Step S103 is executed ten times within 30 minutes, but a probability of recording the predetermined operation in the play image two times or more, that is, executing Step S105 two times or more is about 99%.

Note that when Step S105 is executed more than two times in the aforementioned example, the values of the fixed-value deviation and the linear deviation may be determined by extracting only two operations, such as operations at the beginning and the end, among operations of the sensor apparatus 100 recorded in the play image. Alternatively, as described above, the values of the fixed-value deviation and the linear deviation may be determined for each section or by averaging calculation results for the sections.

Figure 10:
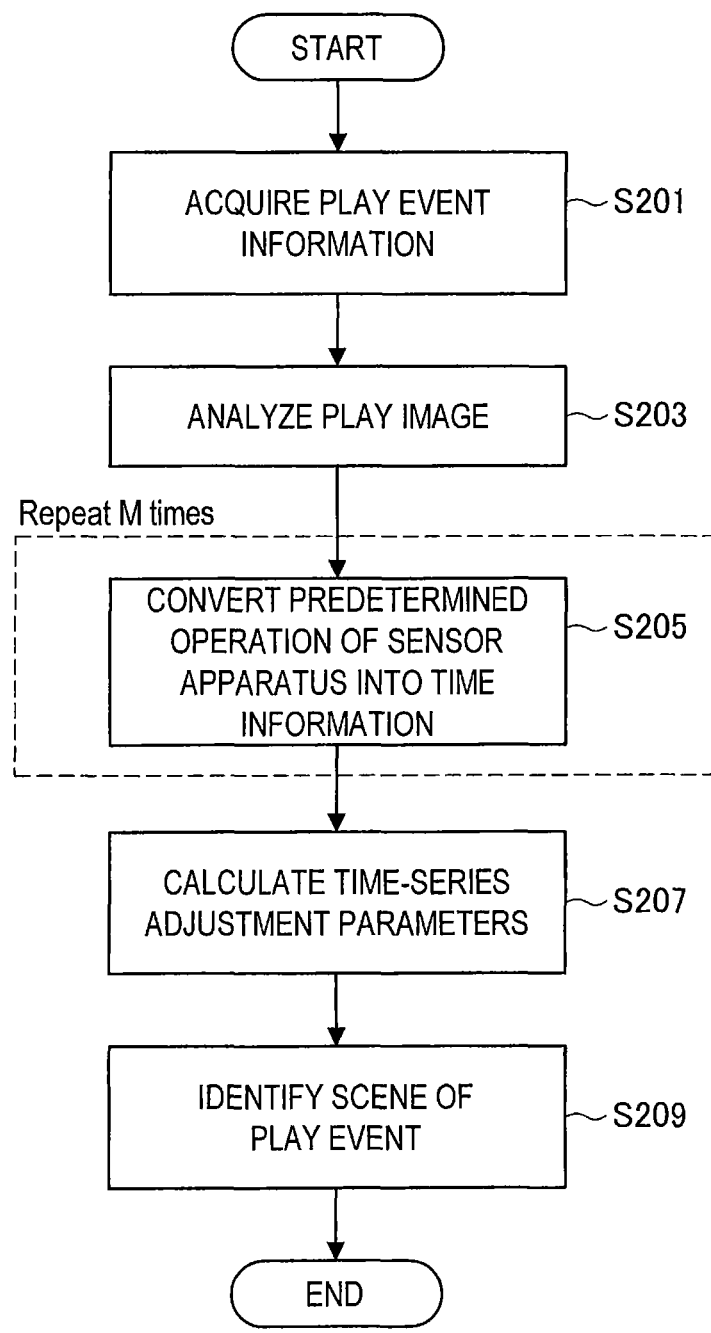
FIG. 10 is a flowchart illustrating an example of processing after the image capturing in the first embodiment of the present disclosure.

FIG. 10 is a flowchart illustrating an example of processing after the image capturing in the first embodiment of the present disclosure. In the example in FIG. 10, the imaging apparatus 200 firstly acquires play event information (Step S201). Here, the play event information can be information generated by the analysis unit 207 of the imaging apparatus 200 based on sensor information received from the sensor apparatus 100 after the play image is captured. Alternatively, the play event information may be generated by the sensor apparatus 100 based on the sensor information and transmitted from the sensor apparatus 100 to the imaging apparatus 200 after the play image is captured.

Note that in the present embodiment, the play event information itself is not referred to until Step S209 to be described later, and thus Step S201 may be executed at later timing. Note that the example illustrated in the figure assumes a case where, for example, the user connects the sensor apparatus 100 and the imaging apparatus 200 after one or more play images are captured, where the analysis unit 207 generates play event information based on the sensor information transmitted from the sensor apparatus 100 to the imaging apparatus 200 (Step S201), and where the generation triggers execution of processing in and after Step S203. In another example, timing of executing Step S201 can be set at any timing between Steps S203 and S207 or at timing parallel with part or entirety of Steps S203 to S207.

Next, the analysis unit 207 of the imaging apparatus 200 analyzes each play image captured by the imaging unit 201 and accumulated in the storage unit 203 (Step S203). The analysis here may be an analysis of, for example, an image or audio of the play image. For example, the analysis unit 207 performs matching on patterns provided in advance for images or audio indicating the predetermined operations of the sensor apparatus 100 to thereby extract one or more predetermined operations of the sensor apparatus 100 recorded in the play image. Note that when any predetermined operation of the sensor apparatus 100 is not detected in Step S203, the imaging apparatus 200 may consider that it is not possible to perform the time-series adjustment and thus may terminate the processing by skipping the subsequent steps. The imaging apparatus 200 may display an error message to the user through the output unit 209 or the like.

Next, the analysis unit 207 converts each predetermined operation of the sensor apparatus 100 extracted in Step S203 into time information (Step S205). For example, based on the pattern of the image or the audio indicating the predetermined operation of the sensor apparatus 100 each of which is provided in advance and based on information defining a time indicated by the predetermined operation, the analysis unit 207 converts the extracted predetermined operation of the sensor apparatus 100 into time information. Note that at this time, a time stamp (time) of the play image at the time of executing the predetermined operation of the sensor apparatus 100 can also be identified.

Step S205 described above is repeated a predetermined number of times (M times; M=1, 2, 3, . . . ). The number of times M may be, for example, the number of operations of the sensor apparatus 100 extracted from the play image in Step S203. In this case, all the operations extracted in Step S203 are converted into time information. Here, for example, if M is 3 or larger, the time-series adjustment parameters can be calculated in Step S207 to be described later, for each section or by averaging calculation results of the sections.

Alternatively, the number of times M may be, for example, a predetermined number set in advance in consideration for the efficiency of processing in subsequent Step S207. In this case, only part of the operation extracted in Step S203 can be converted into time information. Note that in the case where the number of times of extracting the operation in Step S203 falls below the number of times M (such as the case where although M=2 is set, the number of times of extracting the operation in Step S203 is only 1), the imaging apparatus 200 may consider that it is not possible to perform the time-series adjustment and thus may terminate the processing at that time point by skipping the subsequent steps. Alternatively, the imaging apparatus 200 may change processing in the subsequent steps from ordinary processing depending on the number of times and may then execute the processing (for example, when the operation is extracted only once in Step S203, the imaging apparatus 200 considers that there is no linear deviation).

Next, the analysis unit 207 calculates the time-series adjustment parameters based on a combination of the time in the sensor apparatus 100 and the time in the imaging apparatus 200 which are identified in Step S205 (Step S207). As described above, the time-series adjustment parameters are the parameters for making an adjustment between a time series of sensor information and a time series of a play image. When the aforementioned model in FIG. 5 is used, the values of a and b are applicable to these. The analysis unit 207 calculates the time-series adjustment parameters, for example, by solving an equitation obtained by substituting a combination of a time in the sensor apparatus 100 and a time in the imaging apparatus 200 into a relation equitation derived from a time-series deviation model (not limited to the example in FIG. 5). If three or more combinations of a time in the sensor apparatus 100 and a time in the imaging apparatus 200 are given, the time-series adjustment parameters may be calculated for each section or by averaging calculation results of the sections.

Next, by using the time-series adjustment parameters calculated in Step S207, the analysis unit 207 converts a time in the sensor apparatus 100 indicated by a time stamp of the play event information to synchronize with a time in the imaging apparatus 200 used in a time stamp of the play image, and identifies a scene corresponding to the converted time in the play image as a scene of the play event (Step S209). Here, for example, a time before or after the converted time may be set so that the scene of the play event can last for a period according to the type of the play event. Alternatively, a time converted using a time stamp of the start of the play event included in the play event information and a time converted using a time stamp of the end may be respectively set as a start point and an end point of the scene of the play event.

Although processing after identifying the scene of the play event in the play image in the aforementioned processing is not illustrated in the figure, the following processing and the like can be performed as the processing after the identification. For example, as has been described as the functions of the analysis unit 207, a digest image including a scene of a designated play event is generated; additional information, such as chapter information corresponding to the play event, is set in the play image; and definition of the scene of the play event is recorded as data separate from the play image.

The first embodiment of the present disclosure has heretofore been described. In the present embodiment, an adjustment is made between a time series of play event information (sensor information) and a time series of a play image, and thereby a scene of a play event included in the play image can be identified accurately. Thus, for example, in a case where a scene of a play image is extracted by searching or the like utilizing a digest image or chapter information and then is reproduced, this reduces a natural feeling of the user or reproduction of a scene largely deviating from an actual scene of the play event.

Also in the present embodiment, to make the aforementioned adjustment between the time series, the sensor apparatus and the imaging apparatus do not have to communicate with each other in real time while a play image is being captured. Since information of a time in the sensor apparatus is recorded as an image or audio in the play image, the imaging apparatus can calculate the parameters for making an adjustment between time series without communicating with the sensor apparatus. In addition, in the time-series adjustment in the present embodiment, it is not necessary to specify a relation among the reference time and times in the respective apparatuses, and thus not necessary for the apparatuses to perform communications to acquire the reference time. Thus, for example, it is possible to make the apparatuses smaller or lighter by simplifying a configuration of a communication device of each apparatus, to reduce power consumption by reducing the number of times of executing communications by the communication device, and the like.

2. Second Embodiment

Next, a second embodiment of the present disclosure will be described with reference to FIGS. 11 to 13. The present embodiment differs from the first embodiment described above in that a sensor apparatus and an imaging apparatus execute communication with each other while a play image is being captured, so that a time in the sensor apparatus is transmitted to the imaging apparatus through the communication. Note that since a configuration in the present embodiment other than this point can be the same as the configuration of the first embodiment, a detailed description is omitted.

2-1. Functional Configuration

Figure 11:
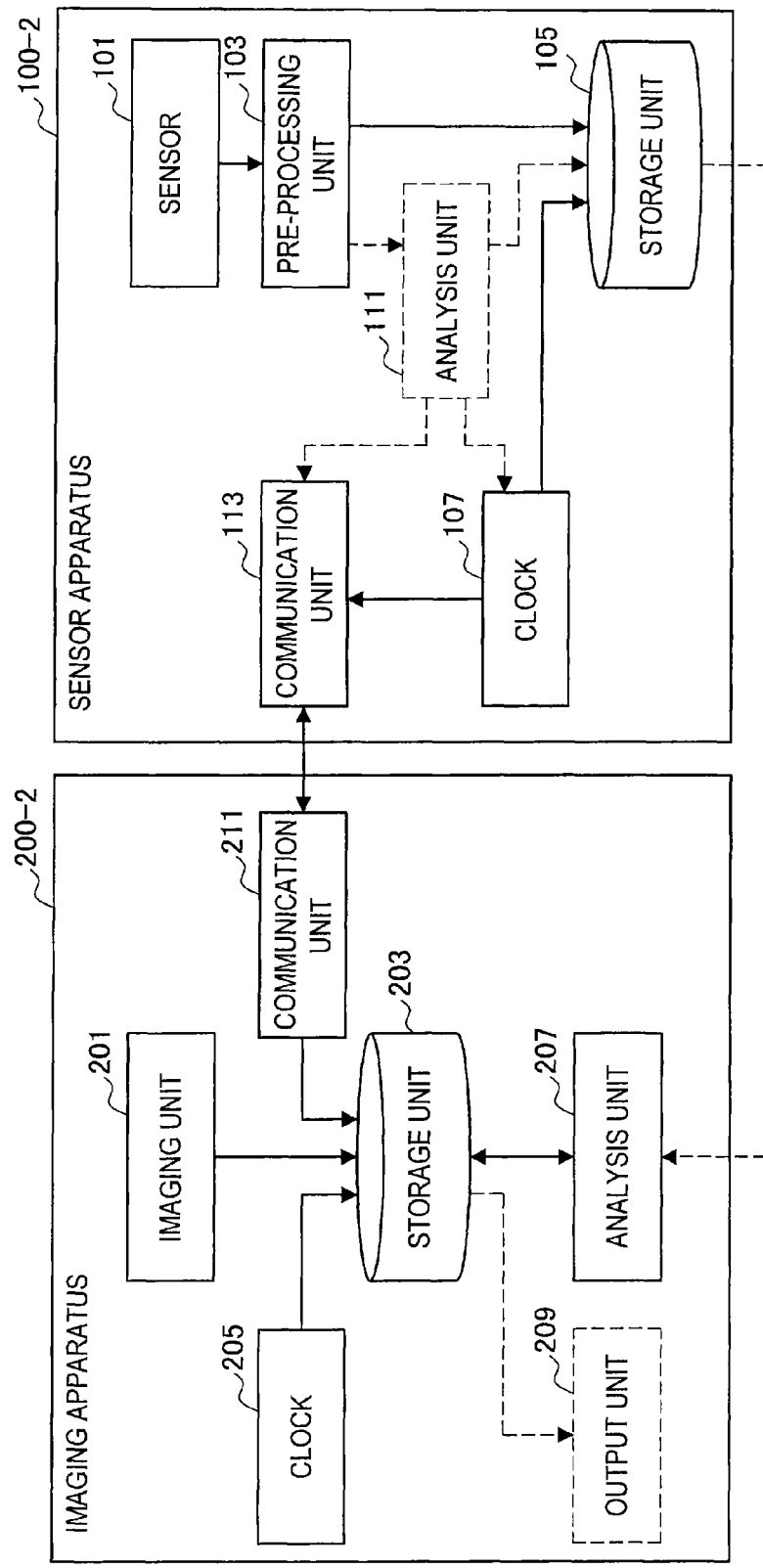
FIG. 11 is a block diagram illustrating a schematic functional configuration of a sensor apparatus and an imaging apparatus according to a second embodiment of the present disclosure.

FIG. 11 is a block diagram illustrating a schematic functional configuration of a sensor apparatus and an imaging apparatus according to the second embodiment of the present disclosure. Hereinafter, a functional configuration of each apparatus will be described with reference to FIG. 11. Note that a hardware configuration for implementing these functions will be described later. Structural elements that have the same functional configuration as that in the first embodiment are denoted with the same reference numerals, and repeated explanation of these structural elements is omitted.

(Sensor Apparatus)

A sensor apparatus 100-2 includes the sensor 101, the pre-processing unit 103, the storage unit 105, the clock 107, and a communication unit 113. The sensor apparatus 100-2 may further include the analysis unit 111 in a modification to be described later.

The communication unit 113 includes a communication device configured to transmit time information in the sensor apparatus 100-2 to an imaging apparatus 200-2, for example, through wireless communication. For example, when the clock 107 reaches a certain time, the communication unit 113 transmits time information indicating the time to a communication unit 211 of the imaging apparatus 200-2. The communication unit 113 may also perform bidirectional communication with the communication unit 211 and transmit time information in response to a query received from the communication unit 211. Note that the communication unit 113 may be the same unit as or a different unit from the communication unit configured to transmit sensor information stored in the storage unit 105 to the imaging apparatus 200-2.

(Imaging Apparatus)

The imaging apparatus 200-2 includes the imaging unit 201, the storage unit 203, the clock 205, the analysis unit 207, and the communication unit 211. The imaging apparatus 200-2 may further include the output unit 209.

The communication unit 211 includes a communication device configured to receive the time information in the sensor apparatus 100-2 transmitted from the sensor apparatus 100-2, for example, through the wireless communication. The time information received by the communication unit 211 from the communication unit 113 of the sensor apparatus 100-2 is stored in the storage unit 203 as metadata to be associated with data of a play image captured at that time by the imaging unit 201. The communication unit 211 may perform bidirectional communication with the communication unit 113 to transmit a query for time information to the communication unit 113 at predetermined intervals, for example, when the imaging unit 201 starts and terminates capturing the play image, or while the imaging unit 201 is capturing the play image. Note that the communication unit 211 may be the same unit as or a different unit from the communication unit configured to receive the sensor information to be provided to the analysis unit 207 from the sensor apparatus 100-2.

(Modification)

In a modification of the present embodiment, the sensor apparatus 100-2 may include the analysis unit 111, and the analysis unit 111 may execute the play-event-information generation processing executed by the analysis unit 207 of the imaging apparatus 200-2 in the example described above. In this case, the storage unit 105 stores therein the play event information instead of or together with sensor information, and the play event information is later transmitted to the imaging apparatus 200-2 through the communication unit. Also in this case, when occurrence of a play event is detected based on the sensor information, the analysis unit 111 may notify the clock 107 or the communication unit 113 of the occurrence of the play event. This notification enables the communication unit 113 to transmit the time information indicating a time in the sensor apparatus 100-2 to the imaging apparatus 200-2 at timing of detecting a play event. Such a configuration is useful, for example, in a case where a play image has such a short image capturing duration that the image capturing duration might not include a predetermined time at which the communication unit 113 transmits the time information but where the time information is desired to be transmitted at appropriate timing without depending on a query from the imaging apparatus 200-2.

2-2. Time-Series Adjustment Processing

Figure 12:
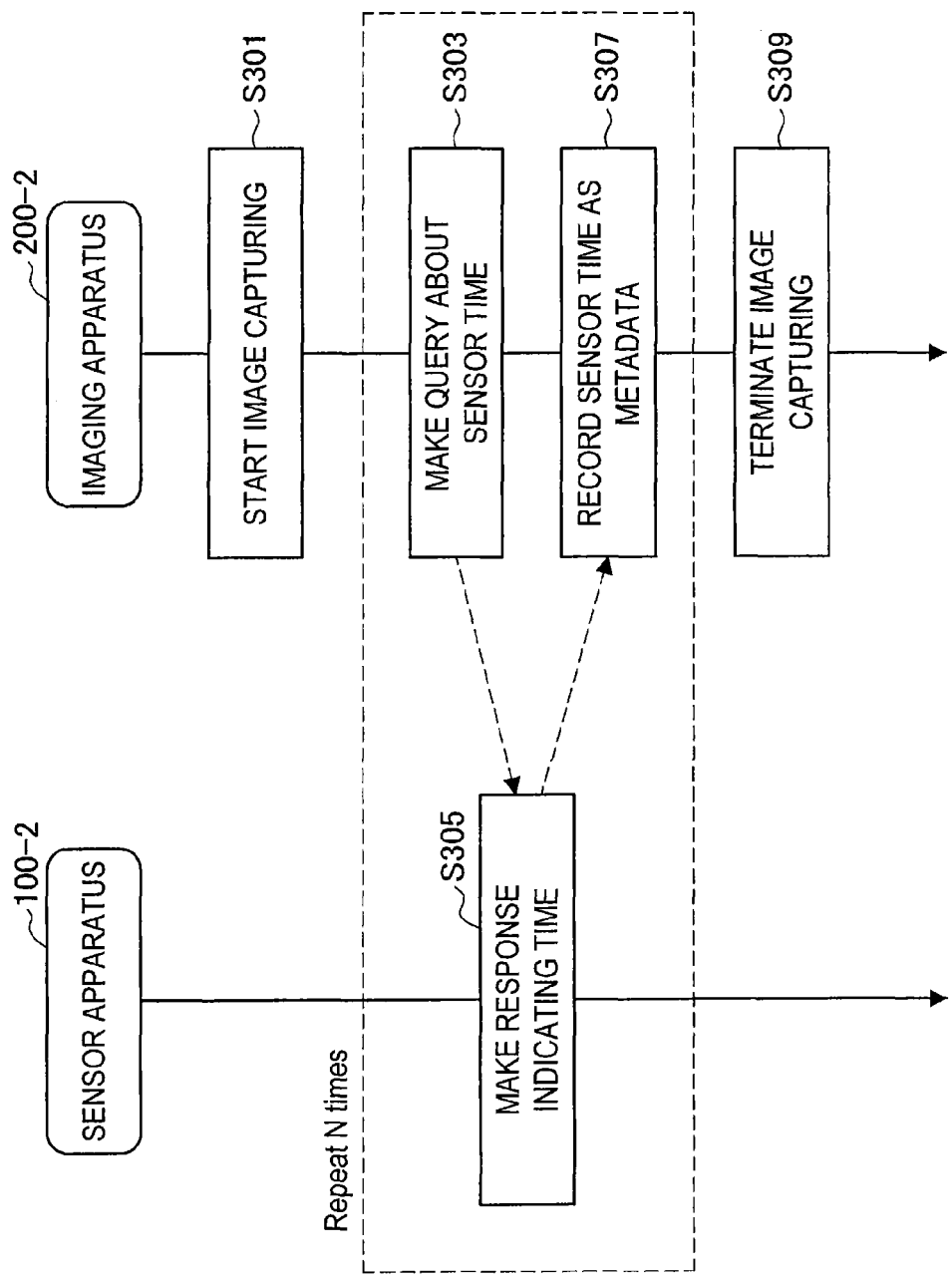
FIG. 12 is a flowchart illustrating an example of processing at the time of image capturing in the second embodiment of the present disclosure.

FIG. 12 is a flowchart illustrating an example of processing at the time of image capturing in the second embodiment of the present disclosure. In the example in FIG. 12, the imaging unit 201 of the imaging apparatus 200-2 firstly starts capturing a play image (Step S301). The captured play image is accumulated in the storage unit 203 together with a time stamp based on a time defined by the clock 205 of the imaging apparatus 200-2.

Next, while being capturing the play image, the imaging apparatus 200-2 transmits a query for a time in the sensor apparatus 100-2 (hereinafter, also referred to as a sensor time) to the sensor apparatus 100-2 (Step S303). The sensor apparatus 100-2 receiving the query transmits, as a reply, time information indicating a sensor time defined by the clock 107 of the sensor apparatus 100-2 to the imaging apparatus 200-2 (Step S305). The imaging apparatus 200-2 receiving the time information records the sensor time indicated by the time information, as metadata of the play image (Step S307).

After Steps S303 to S307 described above are repeated a predetermined number of times (N times; N=1, 2, 3, . . . ), the imaging apparatus 200-2 terminates capturing the play image (Step S309). Note that the number N and executable time-series adjustment processing have the same relation as that in the first embodiment described above.

However, in the present embodiment, time information delivery between the sensor apparatus 100-2 and the imaging apparatus 200-2 is executed through communications such as the wireless communication. Thus, even in the case where the sensor apparatus 100-2 is hidden behind the body of the user or the equipment when viewed from the imaging apparatus 200-2, where the user moves vigorously, or where noise is generated in the audio, the transmission of the time information to the imaging apparatus 200-2 seldom fails. Accordingly, the number of times of executing Steps S303 to S307 is typically constant. Thus, the number of times N may be set at a number close to the number of pieces of time information necessary for the time-series adjustment processing.

In addition, in the example illustrated in the figure, the time information delivery is triggered by a query from the imaging apparatus 200-2, and thus timing for executing the delivery or the number of times N can be determined by the imaging apparatus 200-2. In another example, Step S303 does not have to be executed, and instead of Step S305, the sensor apparatus 100-2 may voluntarily execute a step of transmitting time information to the imaging apparatus 200-2, for example, at predetermined intervals or at timing of detecting occurrence of a play event if the analysis unit 111 exists. In this case, a step of notifying, by the imaging apparatus 200-2, the sensor apparatus 100-2 of the start of play image capturing may be executed, as in the first embodiment.

Figure 13:
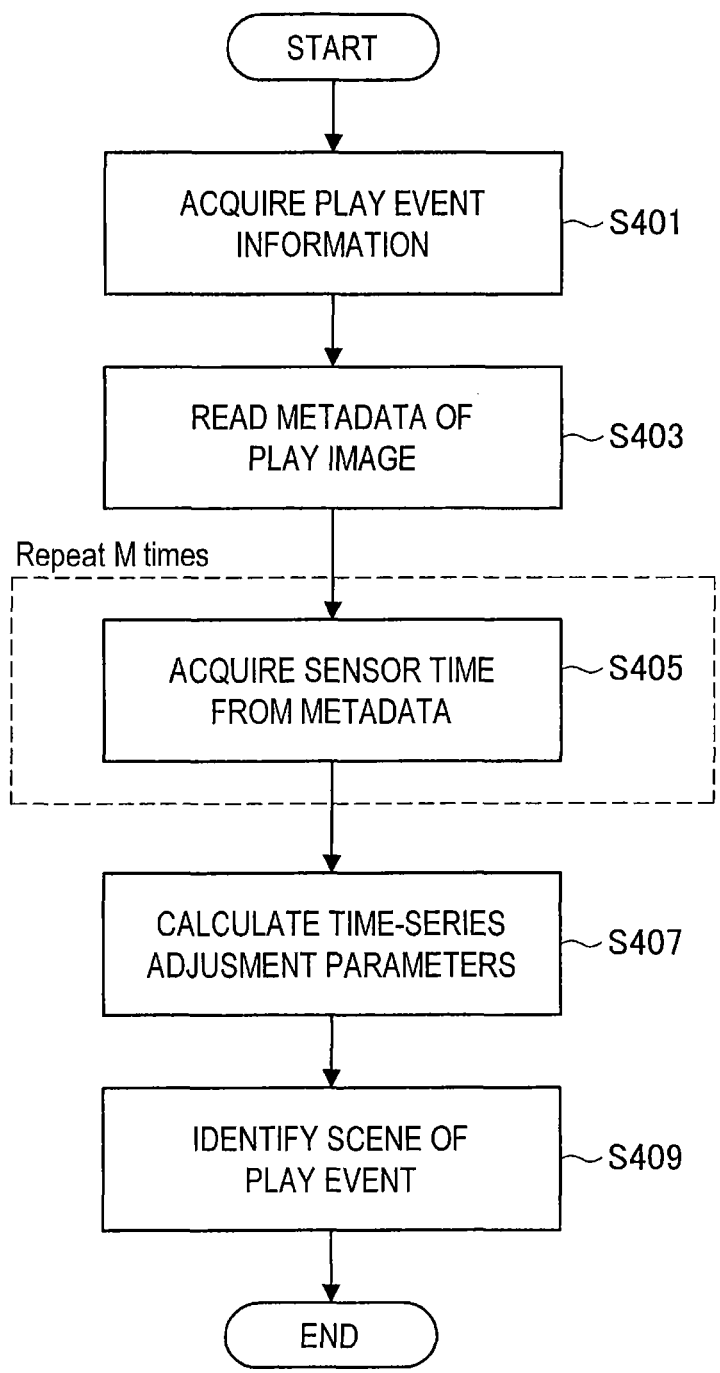
FIG. 13 is a flowchart illustrating an example of processing after the image capturing in the second embodiment of the present disclosure.

FIG. 13 is a flowchart illustrating an example of processing after the image capturing in the second embodiment of the present disclosure. In the example in FIG. 13, the imaging apparatus 200-2 firstly acquires play event information (Step S401). Note that also in the present embodiment, the play event information itself is not referred to until Step S409 to be described later, and thus Step S401 may be executed at later timing. Note that the example illustrated in the figure assumes a case where, for example, the user connects the sensor apparatus 100-2 and the imaging apparatus 200-2 after one or more play images are captured, where the analysis unit 207 generates play event information based on sensor information transmitted from the sensor apparatus 100-2 to the imaging apparatus 200-2 (Step S401), and where the generation triggers execution of processing in and after Step S403. In another example, timing of executing Step S401 can be set at any timing between Steps S403 and S407 or at timing parallel with part or entirety of Steps 403 to S407.

Next, the analysis unit 207 of the imaging apparatus 200-2 reads metadata of each play image captured by the imaging unit 201 and accumulated in the storage unit 203 (Step S403). As described above, the metadata of the play image includes the time information indicating the sensor time transmitted from the sensor apparatus 100-2 to the imaging apparatus 200-2 while the play image is being captured. Note that when the metadata of the play image does not include the time information in Step S403, the imaging apparatus 200-2 may consider that it is not possible to perform time-series adjustment and thus may terminate the processing by skipping the subsequent steps. The imaging apparatus 200-2 may display an error message to the user through the output unit 209 or the like.

Next, from the time information included in the metadata of the play image read in Step S403, the analysis unit 207 acquires sensor time at the time of transmitting the time information (Step S405). Note that the analysis unit 207 also identifies a time stamp (time) of the play image at the time of associating the metadata of the time information. Here, in the case where a communication delay between the sensor apparatus 100-2 and the imaging apparatus 200-2 is known and is too significant to be ignored, the sensor time or the time stamp of the play image (time) may be corrected by an amount equivalent to the delay to a time before or after the sensor time or the time stamp.

Step S405 described above is repeated a predetermined number of times (M times; M=1, 2, 3, . . . ). The number of times M may be, for example, the number of pieces of time information included in the metadata of the play image read in Step S403. In this case, all the pieces of time information included in the metadata are used for calculating the time-series adjustment parameters. Here, for example, if M is 3 or larger, the time-series adjustment parameters can be calculated in Step S407 to be described later, for each section or by averaging calculation results of the sections.

Alternatively, the number of times M may be, for example, a predetermined number set in advance in consideration for the efficiency of processing in subsequent Step S407. In this case, only part of the time information included in the metadata of the play image read in Step S403 can be used for calculating the time-series adjustment parameters. Note that in the case where the number of pieces of time information included in the metadata falls below the number of times M (such as the case where although M=2 is set, the metadata includes only one piece of time information), the imaging apparatus 200-2 may consider that it is not possible to perform the time-series adjustment and thus may terminate the processing at that time point by skipping the subsequent steps. Alternatively, the imaging apparatus 200-2 may change processing in the subsequent steps from ordinary processing depending on the number of times and may then execute the processing (for example, when the metadata includes only one piece of information, the imaging apparatus 200-2 considers that there is no linear deviation).

Next, the analysis unit 207 calculates the time-series adjustment parameters based on a combination of the sensor time acquired in Step S405 and the time in the imaging apparatus 200-2 (Step S407). If three or more combinations of the sensor time and the imaging apparatus 200-2 are given, the time-series adjustment parameters may be calculated for each section or by averaging calculation results of the sections.

Next, by using the time-series adjustment parameters calculated in Step S407, the analysis unit 207 converts a time in the sensor apparatus 100-2 indicated by a time stamp of the play event information to synchronize with a time in the imaging apparatus 200-2 used in a time stamp of the play image, and identifies a scene corresponding to the converted time in the play image as a scene of the play event (Step S409).

Although processing after identifying the scene of the play event in the play image in the aforementioned processing is not illustrated in the figure, the following processing and the like can be performed as the processing after the identification. For example, as has been described as the functions of the analysis unit 207, a digest image including a scene of a designated play event is generated; additional information, such as chapter information corresponding to the play event, is set in the play image; and definition of the scene of the play event is recorded as data separate from the play image.

The second embodiment of the present disclosure has heretofore been described. Also in the present embodiment as in the first embodiment, an adjustment is made between a time series of play event information (sensor information) and a time series of a play image, and thereby a scene of a play event included in the play image can be identified accurately.

Also in the present embodiment, to make the aforementioned adjustment between time series, a time in the sensor apparatus is transmitted to the imaging apparatus through communication such as the wireless communication. Thus, even in the case where the sensor apparatus is hidden behind the body of the user or the equipment, where the user moves vigorously, or where noise is generated in the audio, it is possible to transmit the time in the sensor apparatus without being influenced by these. Although each apparatus has the communication device for executing the communication during the play image capturing and consumes power for executing the communication, it is possible to minimize the power consumption in the following manner, for example. The imaging apparatus transmits a query for the time information in synchronization with start and termination of play image capturing, and the sensor apparatus transmits the time information only when the query is received.

3. Third Embodiment

Next, a third embodiment of the present disclosure will be described with reference to FIGS. 14 to 17. The present embodiment differs from the first and second embodiments described above in that even if a sensor apparatus does not perform other operations than an operation of acquiring sensor information during play image capturing (the sensor apparatus may perform the other operations), timing at which the sensor apparatus detects occurrence of a play event is identified based on image analysis performed by an imaging apparatus. Note that since a configuration in the present embodiment other than the point can be the same as the configuration of the first or second embodiment, a detailed description is omitted.

3-1. Functional Configuration

Figure 14:
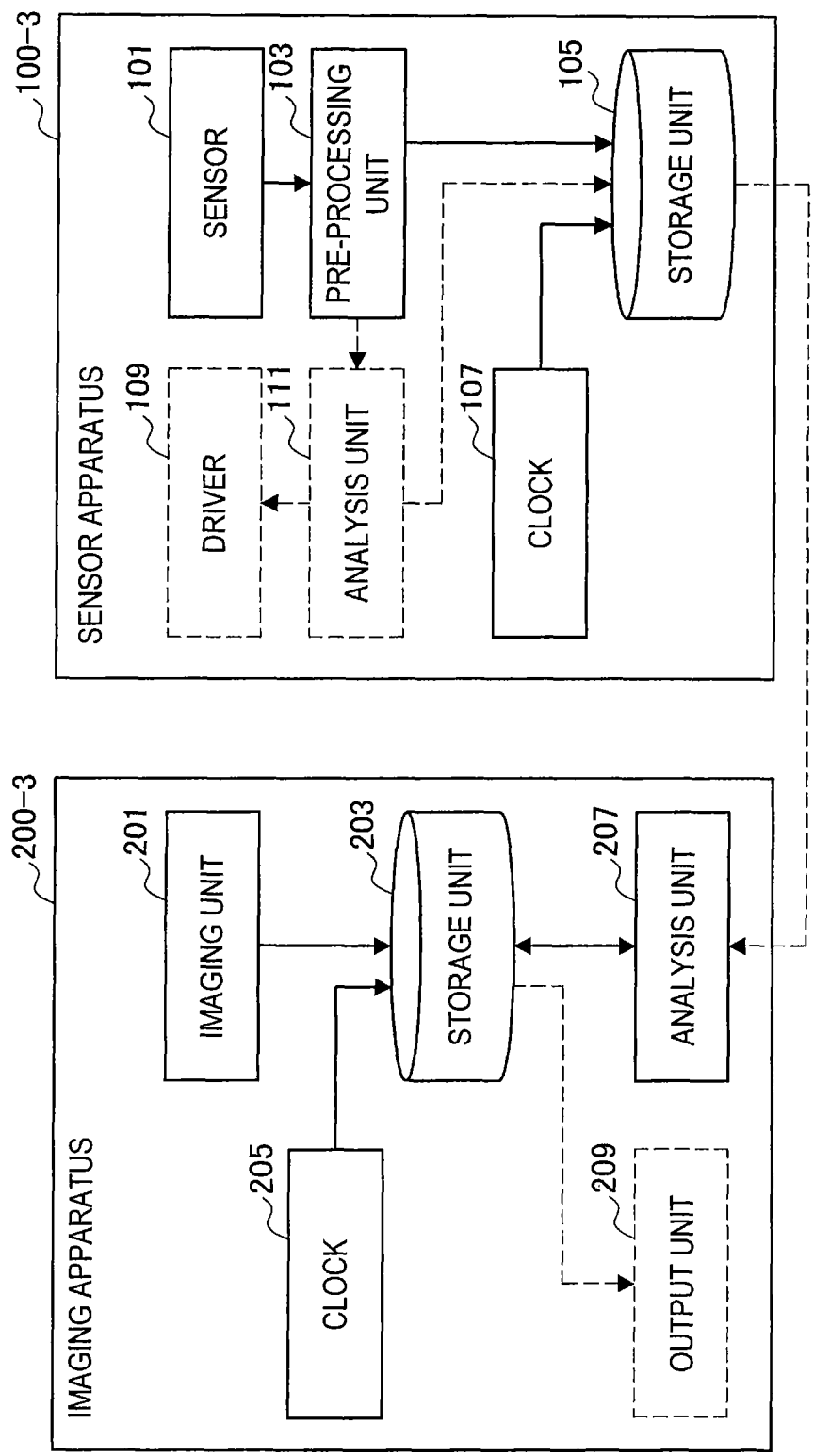
FIG. 14 is a block diagram illustrating a schematic functional configuration of a sensor apparatus and an imaging apparatus according to a third embodiment of the present disclosure.

FIG. 14 is a block diagram illustrating a schematic functional configuration of the sensor apparatus and the imaging apparatus according to the third embodiment of the present disclosure. Hereinafter, the functional configuration of each apparatus will be described with reference to FIG. 14. Note that a hardware configuration for implementing the functions will be described later. Structural elements that have the same functional configuration as that in the first or second embodiment are denoted with the same reference numerals, and repeated explanation of these structural elements is omitted.

(Sensor Apparatus)

A sensor apparatus 100-3 includes the sensor 101, the pre-processing unit 103, the storage unit 105, and the clock 107. In a modification to be described later, the sensor apparatus 100-3 may further include the analysis unit 111 and the driver 109.

The functional configuration of the sensor apparatus 100-3 described above can be the same as that described in the first or second embodiment. However, the sensor apparatus 100-3 according to the present embodiment differs from the sensor apparatus 100 according to the first embodiment or the sensor apparatus 100-2 according to the second embodiment in that it is not necessary to provide means, such as the driver 109 or the communication unit 113, for transmitting a time in the sensor apparatus 100-3 to an imaging apparatus 200-3 through a predetermined operation or communication during play image capturing.

(Imaging Apparatus)

The imaging apparatus 200-3 includes the imaging unit 201, the storage unit 203, the clock 205, and the analysis unit 207. The imaging apparatus 200-3 may further include the output unit 209.

A functional configuration of the imaging apparatus 200-3 can also be the same as that described in the first or second embodiment. However, in the imaging apparatus 200-3 according to the present embodiment, content of an analysis performed by the analysis unit 207 can be different from content of the analyses in the first and second embodiments. More specifically, in the present embodiment, information indicating a time in the sensor apparatus 100-3 during play image capturing is not necessarily recorded in the play image or is not provided from the sensor apparatus 100-3 through communication. Hence, the analysis unit 207 analyzes the play image to detect timing of occurrence of a play event. Then, the analysis unit 207 compares a time stamp of the play image at the detected timing with a time stamp (the time stamp is based on a time in the sensor apparatus 100-3) corresponding to the play event indicated by the play event information acquired by analyzing the sensor information, and thereby makes an adjustment between a time series of the play event information and a time series of the play image. Note that the details of the time-series adjustment processing will be described later.

(Modifications)

In a first modification of the present embodiment, the sensor apparatus 100-3 may have the analysis unit 111, and the analysis unit 111 may execute play-event-information generation processing executed by the analysis unit 207 of the imaging apparatus 200-3 in the aforementioned example. In this case, the storage unit 105 stores therein the play event information instead of or together with the sensor information, and the play event information is later transmitted to the imaging apparatus 200-3 through the communication unit.

In a second modification, when occurrence of a play event is detected based on the sensor information in the above case, the analysis unit 111 may notify the driver 109 of the occurrence of the play event. This notification enables the driver 109 to cause the output device to indicate the occurrence of the play event or the type of the occurring play event, for example, by using sound or light, at timing of detecting the occurrence of the play event. Alternatively, at timing of detecting occurrence of: instruction manipulation by the user (such as turning on the sensor apparatus 100-3, pressing a button provided on the sensor apparatus 100-3, or the like) using a separately provided manipulation unit; or an unordinary play event (such as repeatedly rotating equipment to which the sensor apparatus 100-3 is attached, tapping the equipment a predetermined number of times, or the like), the driver 109 may cause the output device to indicate the occurrence of the manipulation or the play event.

A difference between the second modification described above and the modification of the first embodiment lies in the following point. In the second modification, the output device indicates information on an occurring play event itself. In contrast in the modification of the first embodiment, the output device indicates a time in the sensor apparatus at the time of occurrence of a play event. In the present embodiment, the analysis unit 207 of the imaging apparatus 200-3 makes an adjustment between a time series of the play event information and a time series of a play image based on timing of play event occurrence, instead of a time in the sensor apparatus 100-3, and thus there arises the difference as described above.

3-2. Time-Series Adjustment Processing

Figure 15:
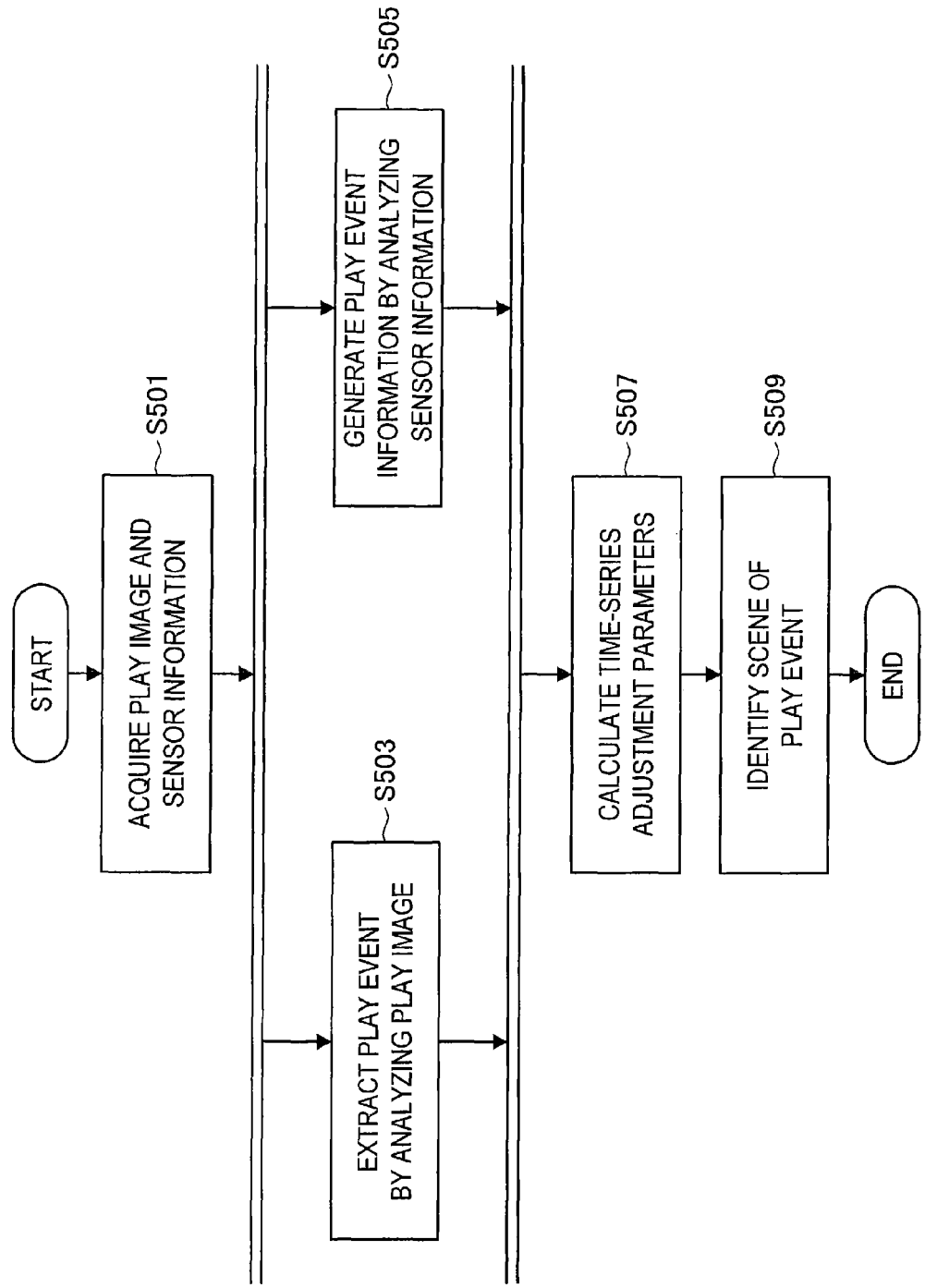
FIG. 15 is a flowchart illustrating an example of processing after the image capturing in the third embodiment of the present disclosure.

FIG. 15 is a flowchart illustrating an example of processing after the image capturing in the third embodiment of the present disclosure. In the example in FIG. 15, the analysis unit 207 of the imaging apparatus 200-3 firstly acquires a play image and sensor information (Step S501). Here, the play image can be acquired as image data captured by the imaging unit 201 of the imaging apparatus 200-3 and stored in the storage unit 203. The sensor information can be received from the sensor apparatus 100-3 through the communication unit after the play image capturing.

Next, the analysis unit 207 extracts a play event by analyzing the play image (Step S503) and acquires play event information by analyzing the sensor information (Step S505). The processing is here performed so as to detect occurrence of the play event during the play image capturing, by using both of first analysis processing based on the play image and second analysis processing based on the sensor information. Note that when the sensor apparatus 100-3 generates the play event information in the modification described above, the play event information can be acquired in Step S501, instead of the sensor information described above. Alternatively, a step of acquiring the play event information from the sensor apparatus 100-3 can be executed instead of Step S505.

After the information on the play event extracted by analyzing the play image and the play event information generated based on the sensor information are prepared in the processing described above, the analysis unit 207 calculates the time-series adjustment parameters (Step S507). Since the time-series adjustment is executed based on timing of play event occurrence in the present embodiment as described above, processing of calculating the time-series adjustment parameters can be different from those in the first and second embodiments, as to be described later.

Next, by using the time-series adjustment parameters calculated in Step S507, the analysis unit 207 converts a time in the sensor apparatus 100-3 indicated by a time stamp of the play event information to synchronize with a time in the imaging apparatus 200-3 used in a time stamp of the play image, and identifies a scene corresponding to the converted time in the play image as a scene of the play event (Step S509).

Although processing after identifying the scene of the play event in the play image in the aforementioned processing is not illustrated in the figure, the following processing and the like can be performed as the processing after the identification. For example, as has been described as the functions of the analysis unit 207, a digest image including a scene of a designated play event is generated; additional information, such as chapter information corresponding to the play event, is set in the play image; and definition of the scene of the play event is recorded as data separate from the play image.

3-3. Time-Series Adjustment Processing

Figure 16:
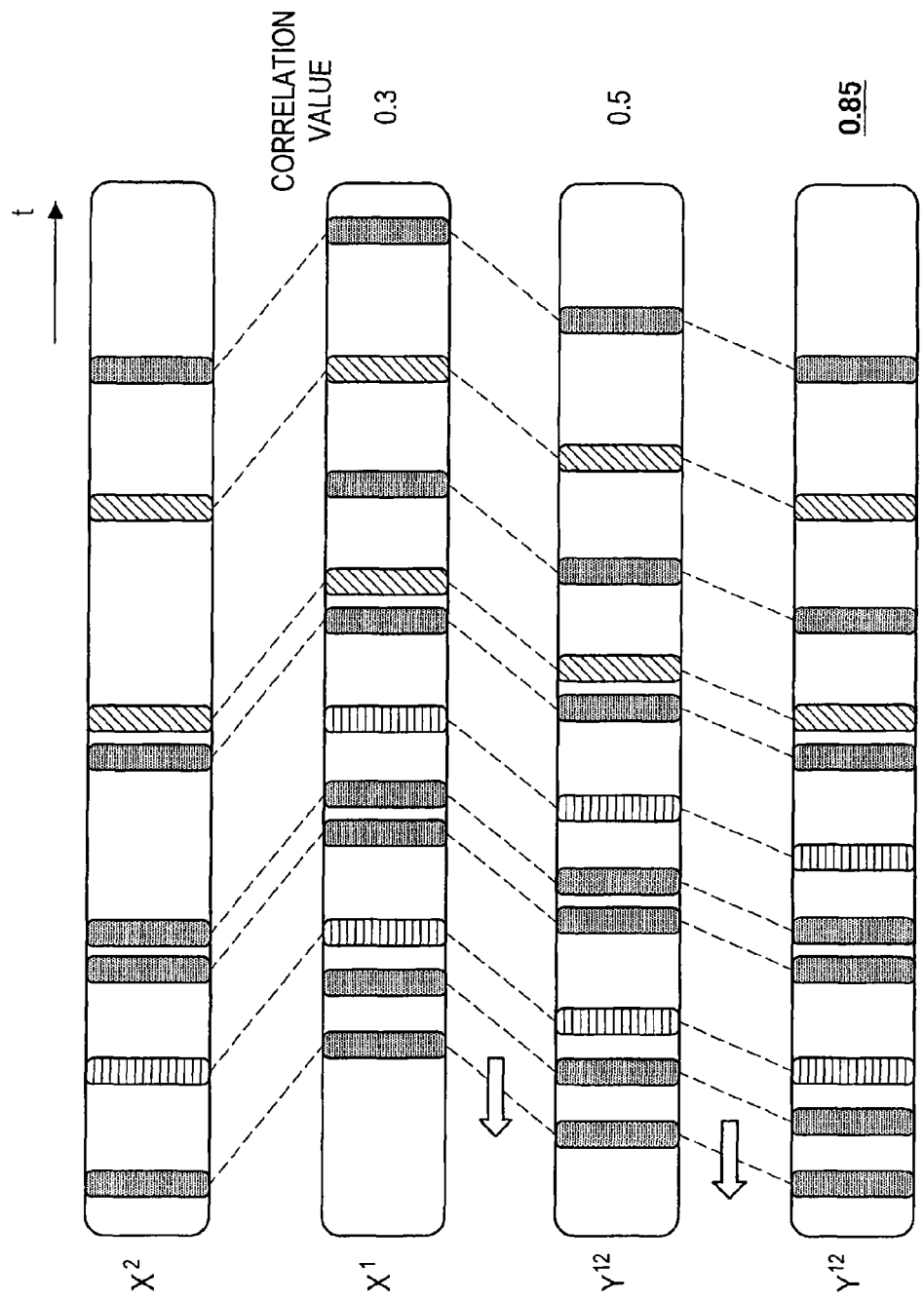
FIG. 16 is a diagram for explaining time-series adjustment processing in the third embodiment of the present disclosure.

FIG. 16 is a diagram for explaining the time-series adjustment processing in the third embodiment of the present disclosure. FIG. 16 illustrates a play event group $X^2$ extracted by analyzing the play image and a play event group $X^1$ indicated by the play event information generated based on the sensor information. Since a deviation might occur between a time in the sensor apparatus 100-3 and a time in the imaging apparatus 200-3 as described above, there is a time-series deviation between the play event group $X^2$ and the play event group $X^1$ in the example in the figure.

To adjust the deviation, a play event group $Y^{12}$ generated in the present embodiment. In the play event group $Y^{12}$, a time series is adjusted by offsetting the play event group $X^1$ and changing the length of a time series of the play event group $X^1$. The play event group $Y^{12}$ is repeatedly updated to obtain a higher value of a correlation between the play event group $Y^{12}$ and the play event group $X^2$ extracted by analyzing the play image. The update leads to an optimum play event group $Y^{12}$ in which the time-series deviation from the play event group $X^2$ is adjusted.

In the example illustrated in the figure, the extraction of play events based on the play image analysis is performed with lower accuracy than the extraction of play events based on the sensor information analysis, some of the play events included in the play event group $X^1$ are not included in the play event group $X^2$. In other words, in detection based on the play image analysis, detection of some play events based on the sensor information analysis fails. In addition, due to a detection method difference, timing of occurrence of a play event detected by analyzing the play image and timing of occurrence of a play event indicated by the play event information might have a deviation different from the time-series deviation.

Accordingly, even offsetting the play event group $Y^{12}$ and changing the length of the play event group $Y^{12}$ which are performed optimally do not necessarily result in a correlation with the play event group $X^2$ which takes on a value of 1. In the example illustrated in the figure, a value of a correlation between the play event group $X^1$ yet to be adjusted and the play event group $X^2$ is 0.3, a value of a correlation with the play event group $Y^{12}$ firstly generated is 0.5, and a value of a correlation with the play event group $Y^{12}$ then updated is 0.85. Based on the correlation value of 0.85, the play event group $Y^{12}$ is considered to have been optimized. Note that only one play event group $Y^{12}$ is illustrated in the example in the figure for simplicity, but the update of the play event group $Y^{12}$ can actually be repeated a further larger number of times.

In the second modification of the present embodiment described above, when the driver 109 causes the output device to indicate information on occurrence of a play event, for example, by using sound or light, the sound or light only has to be analyzed instead of movement of the user, to extract a play event based on the play image. Thus, it is possible to not only enhance the accuracy of analyzing a play event based on a play image but also reduce processing load for the analysis. However, also in this case, the output device such as the lamp, the display, or the like might be hidden when viewed from the imaging unit 201. Accordingly, it is not necessarily possible to extract all of play events included in play event information based on the play image.

Figure 17:
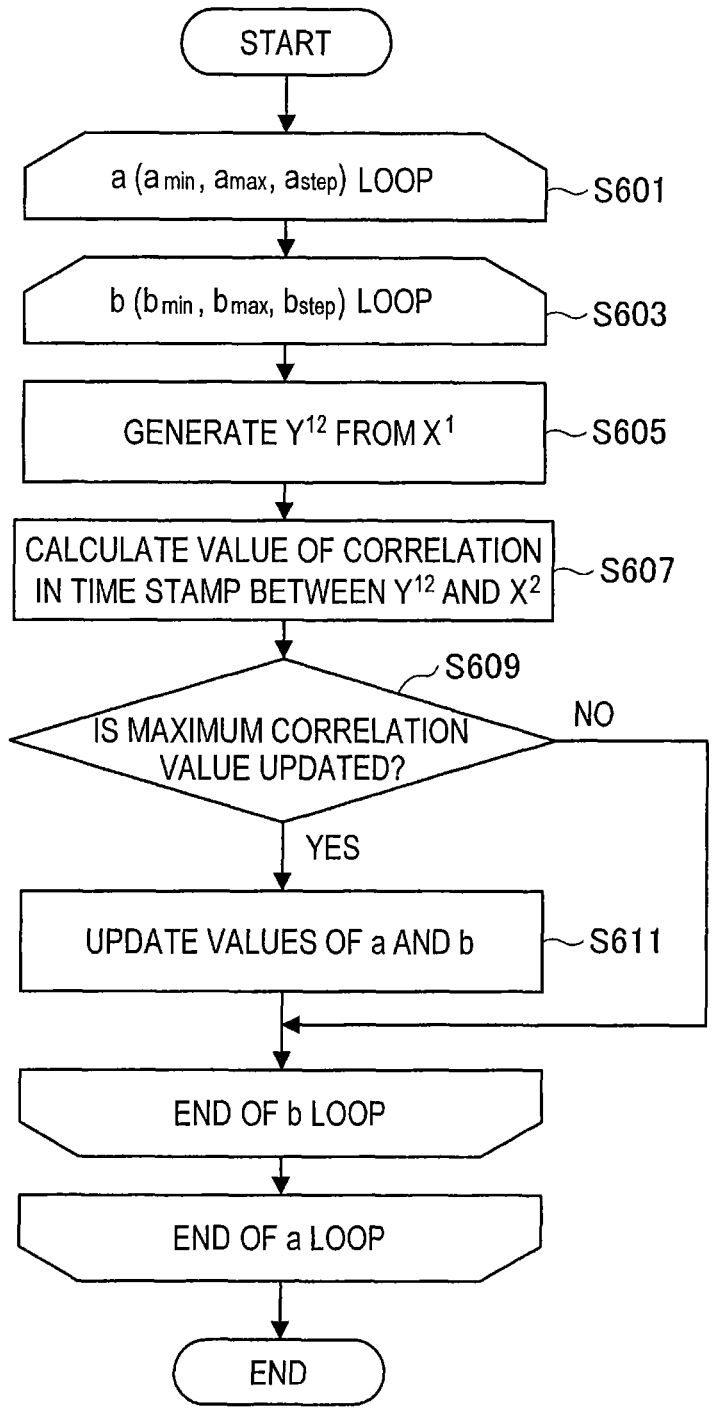
FIG. 17 is a flowchart illustrating an example of processing of calculating time-series adjustment parameters according to the third embodiment of the present disclosure.

FIG. 17 is a flowchart illustrating an example of processing of calculating the time-series adjustment parameters in the third embodiment of the present disclosure. In the example in FIG. 17, optimum values of the parameters a and b in y=ax+b (x is a time in the sensor apparatus 100-3, and y is a time in the imaging apparatus 200-3) are searched for by using the aforementioned model in FIG. 5.

In the example illustrated in the figure, loop processing is executed for each of the aforementioned parameters a and b (Steps S601 and S603). Minimum values ($a_{min}$ and $b_{min}$), maximum values ($a_{max}$ and $b_{max}$), and step sizes ($a_{step}$ and $b_{step}$) for attempts are set in the loops. The values can be set based on the degree of an assumable maximum/minimum linear deviation/fixed-value deviation, a reasonable number of attempts from a processing load viewpoint, and the like. For example, in the case of the loop processing for b (Step S603), when the maximum degree of an assumable fixed-value deviation is approximately ten minutes, the minimum value $b_{min}$=−ten minutes and the maximum value $b_{max}$=+ten minutes can be set. Alternatively, for example, if approximately 1200 times are reasonable for executing the loop processing for b, a step size $b_{step}$=one second can be set. In the case of the loop processing for a (Step S601), a minimum value $a_{min}$, a maximum value $a_{max}$, and a step size $a_{step}$ may likewise be set, for example, based on occurrence of a linear deviation due to an error of up to 150 ppm of the oscillation frequency of a crystal oscillator.

In processing in the loop, a play event group $Y^{12}$ is firstly generated from a play event group $X^1$ (a play event group indicated by play event information) by using currently set parameter values of a and b (Step S605). Here, in the play event group $Y^{12}$, a time stamp $x^1$ of each play event included in the play event group $X^1$ is converted in $y^{12}=ax^1+b$.

Next, a correlation value between $Y^{12}$ generated in Step S605 and a play event group $X^2$ (a play event group extracted by analyzing a play image) (Step S607). Note that an example of a method for calculating a correlation value will be described later.

When the minimum correlation value calculated in preceding processing in the loop is updated to the correlation value calculated here (YES in Step S609), the temporarily stored parameter values of a and b are updated. On the other hand, the calculated correlation value is equal to or lower than the correlation value calculated in the preceding processing in the loop (NO in Step S609), the stored parameters a and b are not updated, and the processing moves to the next processing in the loop. Note that in the initial processing in the loop, the initially set parameter values of a and b are stored without being changed.

In the aforementioned manner, the parameter values of a and b which are optimum parameter values of a and b are obtained as results of executing the loop processing for the parameters a and b from a predetermined minimum value to a predetermined maximum value in a predetermined step size.

(Calculating Correlation Value)

As described above, the play event group $Y^{12}$ might not include some of play events included in the play event group $X^2$. In other words, $Y^{12}=\{y^{12}_1, y^{12}_2, \ldots, y^{12}_m\}$ and $X^2=\{x^2_1, x^2_2, \ldots, x^2_n\}$ might result in m≠n. Accordingly, even though time stamps of play events which are elements of $Y^{12}$ and $X^2$ are compared between $Y^{12}$ and $X^2$ serially from the beginning, a correlation value as intended in the example in FIG. 16, for example, might not be obtained as a calculation result.

Hence, in an example, the correlation value may be calculated by converting the play event group $Y^{12}$ and the play event group $X^2$ into micro time arrays obtained by dividing a shooting duration of a play image (the maximum value of the linear deviation can be taken into consideration) by the minimum resolution of the time stamps. In this case, each micro time array includes, as elements, micro times the number of which is N (a shooting duration of a play image/the minimum resolution of time stamps). For example, in a case where the shooting duration of the play image is 15 minutes (15 minutes+0.3 seconds in the case of the maximum linear deviation) and where the minimum resolution of the time stamps is 0.1 seconds, each micro time array includes 9003 micro times as elements.

In the micro time arrays thus generated, a correlation ratio can be calculated based on an arrangement correlation between a micro time corresponding to a time stamp (can be set in 1, for example) of a play event and a different micro time (can be set in 0, for example). Note that the method for calculating a correlation value is not limited to this example, and various known methods can be used.

The third embodiment of the present disclosure has heretofore been described. Also in the present embodiment as in the first embodiment, an adjustment is made between a time series of play event information (sensor information) and a time series of a play image, and thereby a scene of a play event included in the play image can be identified accurately. The analysis based on the play image might be performed with not enough accuracy as described above. Thus, by using play event information having undergone time-series adjustment, it is possible to accurately identify a scene of a play event included in a play image.

Moreover, in the present embodiment, occurrence of a play event is detected based on an analysis of a play image performed by the imaging apparatus. Thus, even though the sensor apparatus does not perform a predetermined operation indicating a time while the play image is being captured, or even though a time is not transmitted to the imaging apparatus through communication, the aforementioned time-series adjustment can be executed. Thus, it is possible to minimize a device configuration or power consumption of the sensor apparatus.

4. Fourth Embodiment

Figure 18:
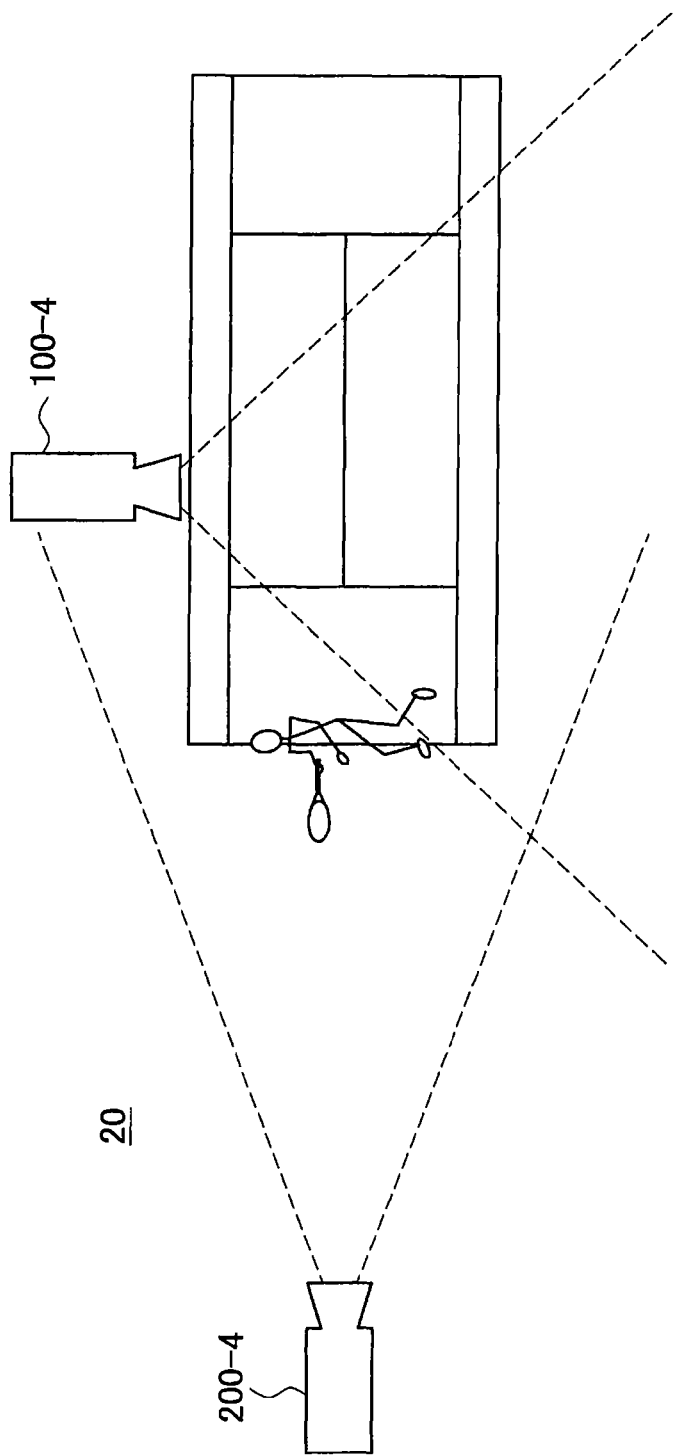
FIG. 18 is a diagram illustrating an outline of an information processing system according to a fourth embodiment of the present disclosure.

Next, a fourth embodiment of the present disclosure will be described with reference to FIG. 18. With reference to FIG. 18, an information processing system 20 includes an imaging apparatus 100-4 and an imaging apparatus 200-4. The present embodiment differs from the first to third embodiments described above in that an apparatus (the imaging apparatus 100-4) serving as a sensor apparatus does not acquire sensor information but captures a play image like the imaging apparatus 200-4, so that play event information is generated by analyzing the captured play image. Note that since a configuration in the present embodiment other than this point can be the same as the configuration of each of the first to third embodiments, a detailed description is omitted.

The imaging apparatus 100-4 has a functional configuration including an imaging unit, a storage unit, a clock, and the like, like the imaging apparatuses in the other embodiments described above, and captures play images of sports, for example, within an angle of view of the imaging apparatus 200-4. Data of each captured play image is temporarily stored in the imaging apparatus 100-4, and thereafter can be transmitted to the imaging apparatus 200-4, for example, when the user connects the imaging apparatus 100-4 and the imaging apparatus 200-4 after the end of the play. The imaging apparatus 100-4 may further include an analysis unit and generate play event information by analyzing the captured play image. The play event information can be transmitted to the imaging apparatus 200-4 together with the play image.

The imaging apparatus 200-4 has a functional configuration including an imaging unit, a storage unit, a clock, and an analysis unit, like the imaging apparatuses in the other embodiments described above, and captures images of play images of sports. Data of each captured play image is at least temporarily stored in the imaging apparatus 200-4. The imaging apparatus 200-4 receives the play image captured at a different angle of view, from the imaging apparatus 100-4, after the end of the play, for example. The imaging apparatus 200-4 may also receive, from the imaging apparatus 100-4, the play event information generated by analyzing the play image captured by the imaging apparatus 100-4.

The imaging apparatus 200-4 generates play event information (first play event information) by analyzing a play image (first play image) captured by the imaging apparatus 200-4 itself, and makes a comparison in play-event occurrence timing between the first play event information with play event information (second play event information) generated by analyzing a play image (second play image) captured by the imaging apparatus 100-4 (the analysis may be executed by the imaging apparatus 200-4 or the imaging apparatus 100-4). For example, parameters for making an adjustment between a time series of the first play image and a time series of the second play event information can be calculated by the same comparison processing as in the third embodiment described above.

Here, the second play event information is set according to a time stamp of the second play image based on a time in the imaging apparatus 100-4. Accordingly, it is also possible to make an adjustment between time stamps of the first and second play images, by using parameters for making an adjustment between a time series of the first play event information and a time series of second play event information. For this reason, application of, for example, the time-series adjustment parameters enables synchronization of the first play image and the second play image and thus enables simultaneous reproduction of a plurality of play images obtained by capturing the same play at different angles of view.

The fourth embodiment of the present disclosure has heretofore been described. In the present embodiment, application of the processing of making an adjustment between a time series of play event information and a time series of a play image enables synchronous reproduction of the plurality of play images in synchronization with each other. The synchronous reproduction of a plurality of images is generally executed, for example, in a manner that a plurality of imaging apparatuses refer to a common master time. However, according to the present embodiment, even when it is difficult to refer to the common master time under some circumstances such as a communication environment, it is possible to make an adjustment between time series of play images based on play-event occurrence timing.

5. Hardware Configuration

Next, an example of a hardware configuration for implementing a sensor apparatus and an information processing apparatus (the imaging apparatus in the aforementioned examples) will be described with reference to FIGS. 19 and 20.

(Sensor Apparatus)

Figure 19:
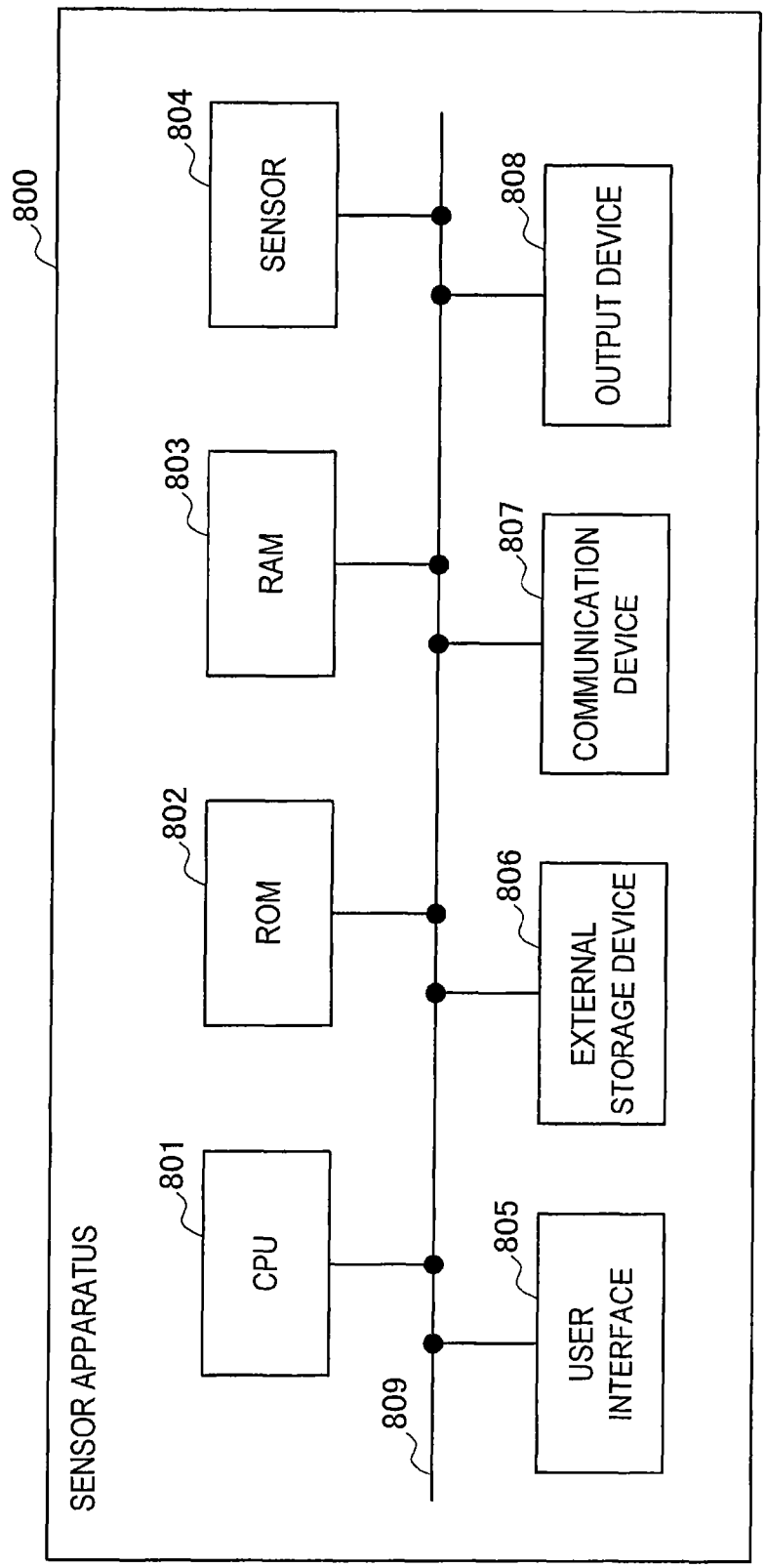
FIG. 19 is a diagram illustrating an example of a hardware configuration of a sensor apparatus according to an embodiment of the present disclosure.

FIG. 19 is a diagram illustrating the example of the hardware configuration of the sensor apparatus according to an embodiment of the present disclosure. A sensor apparatus 800 can implement the sensor apparatus according to an embodiment of the present disclosure, such as the sensor apparatuses 100 to 100-3, and the imaging apparatus 100-4 which are described above.

The sensor apparatus 800 can include a CPU (Central Processing Unit) 801, a ROM (Read Only Memory) 802, a RAM (Random Access Memory) 803, a sensor 804, a user interface 805, an external storage device 806, a communication device 807, and an output device 808. These components are mutually connected, for example, through a bus 809.

The CPU 801, the ROM 802, and the RAM 803 read and execute program instructions stored, for example, in the external storage device 806 to thereby implement various functions as software. In an embodiment of the present disclosure, the CPU 801, the ROM 802, and the RAM 803 can implement, for example, overall control of the sensor apparatus 800 and the function of the pre-processing unit 103 in the aforementioned example.

The sensor 804 corresponds to the sensor 101 in the functional configuration of each embodiment described above. Note that the sensor 804 can include, for example, an acceleration sensor, an angular velocity sensor, a vibration sensor, a temperature sensor, a pressure sensor (including a press switch), or a GPS (Global Positioning System) receiver. Alternatively, for example, the imaging apparatus 100-4 may be provided with an imaging unit instead of the sensor 804.

The user interface 805 is an input device such as a button or a touch panel configured to receive the user's manipulation of the sensor apparatus 800. The user's manipulation can be an instruction, for example, for starting or terminating transmission of sensor information from the sensor apparatus.

The external storage device 806 stores therein variety of information on the sensor apparatus 800. The external storage device 806 may store therein, for example, the program instructions for implementing functions of the CPU 801, the ROM 802, and the RAM 803 as software, or may temporarily store therein data acquired by the sensor 804, as cache. In consideration of wearing of the sensor apparatus 800 on the user himself/herself or sporting equipment, it is desirable to use an impact-resistant device such as a semi-conductor memory, as the external storage device 806.

The communication device 807 corresponds to the communication unit (including the not shown communication unit) in the functional configuration of each embodiment described above. The communication device 807 communicates with an information processing apparatus 900 to be described later by using an appropriate one of various wired or wireless communication methods. In addition, the communication device 807 may communicate with the information processing apparatus 900 directly through inter-device communication, or through a network such as the Internet.

The output device 808 is configured of a device capable of outputting information as light, audio, or an image. For example, as in the embodiments described above, the output device 808 may output information making a notification of a time in the sensor apparatus 800 or detection of a play event or may output a notification to the user visually or audibly. The output device 808 includes, for example, a lamp such as an LED, a display such as an LCD, a speaker, or a vibrator providing vibrations to the user himself/herself or the equipment.

(Information Processing Apparatus)

Figure 20:
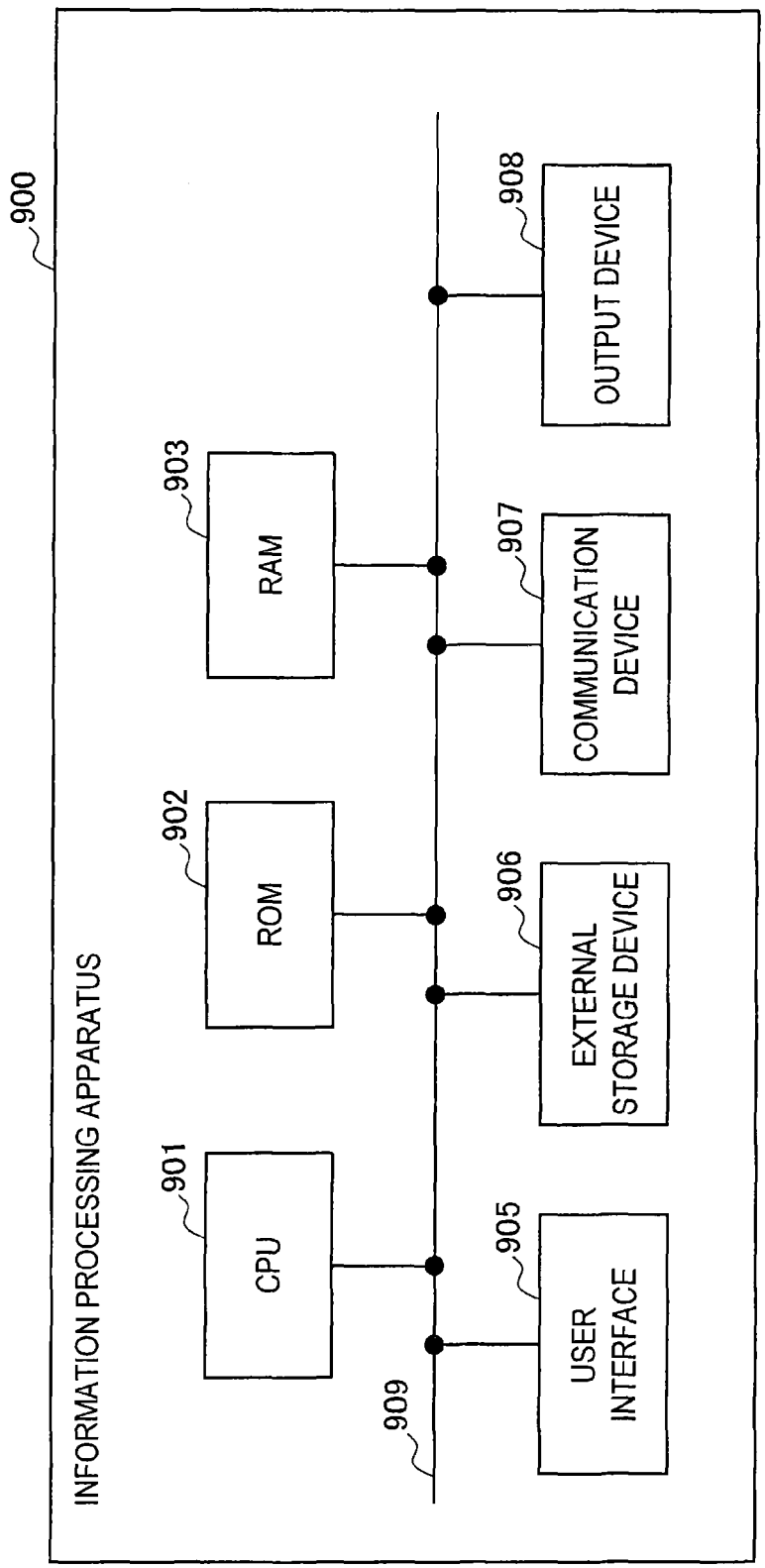
FIG. 20 is a diagram illustrating an example of a hardware configuration of an information processing apparatus according to an embodiment of the present disclosure.

FIG. 20 is a diagram illustrating an example of a hardware configuration of the information processing apparatus according to an embodiment of the present disclosure. The information processing apparatus 900 can implement the information processing apparatus according to an embodiment of the present disclosure, such as the imaging apparatuses 200 to 200-4 described above. As described above, the information processing apparatus may also be implemented as a server, on a network, which has the same function of the analysis unit 207 of the imaging apparatus described above.

The information processing apparatus 900 can include a CPU 901, a ROM 902, a RAM 903, a user interface 905, an external storage device 906, a communication device 907, and an output device 908. These components are mutually connected, for example, through a bus 909. For example, when the information processing apparatus 900 is implemented as an imaging apparatus as in the examples described above, the information processing apparatus 900 may further include an imaging unit.

The CPU 901, the ROM 902, and the RAM 903 read and execute program instructions stored, for example, in the external storage device 906 to thereby implement various functions as software. In an embodiment of the present disclosure, the CPU 901, the ROM 902, and the RAM 903 can implement, for example, overall control of the information processing apparatus 900 and the function of the analysis unit 207 in the aforementioned example, and the like.

The user interface 905 is an input device such as a button or a touch panel configured to receive the user's manipulation of the information processing apparatus 900.

The external storage device 906 stores therein variety of information on the image processing apparatus 900. The external storage device 906 may store therein, for example, the program instructions for implementing functions of the CPU 901, the ROM 902, and the RAM 903 as software, or may temporarily store sensor information received by the communication device 907, as cache. The external storage device 906 may also accumulate logs of play event information and sensor information.

The output device 908 is configured of a device capable of notifying the user of information visually or audibly. The output device 908 can be, for example, a display device such as an LCD, or an audio output device such as a speaker or a headphone. The output device 908 outputs a result of processing by the information processing apparatus 900, as text or video such as an image, or audio such as a voice or a sound. When the information processing apparatus 900 is a terminal device used by the user, the output device 908 may output, for example, a play image and a digest image generated based on a play image.

6. Supplementary Explanation

The information processing system including the sensor apparatus and the information processing apparatus (the imaging apparatus) has heretofore been described in the embodiments above. The embodiments above also include, for example: a server, on a network, which implements at least part of the function of the information processing apparatus (including a device implemented as a set of functions of a plurality of devices); a program for causing a computer to implement the functions of these devices; and a recording medium having the program recorded therein.

In addition, the embodiments above each describe the example where the information processing apparatus (the imaging apparatus) automatically makes an adjustment between a time series of a play image and a time series of play event information, but are not limited to this example. In another embodiment, for example, a play image at a time point of particular manipulation by the user or occurrence of a play event may be presented to the user, and the user may be able to select whether or not to associate the time point in the play image with a time point of the user manipulation included in play event information or a time point of the play event (that is, these time points are used as reference points for time-series adjustment). Also in this case, it can be said that the information processing apparatus executes the time-series adjustment processing (including a step of acquiring confirmation of the user).

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing system including circuitry configured to acquire captured image data of a subject; and associate a plurality of time points of the image data and a plurality of time points of event information based on sensor time information, the event information acquired based on sensor information acquired in time series by a sensor apparatus and indicating occurrence of an operation of the sensor apparatus.

(2) The information processing system of (1), wherein the circuitry is configured to acquire the sensor time information based on a predetermined operation of the sensor apparatus that is detected in the image data.

(3) The information processing system of (2), wherein the predetermined operation coincides with a time defined by a clock of the sensor apparatus.

(4) The information processing system of (2) or (3), wherein the predetermined operation indicates that the occurrence of an event is detected by the sensor apparatus.

(5) The information processing system of any of (1) to (4), wherein the circuitry is configured to acquire the sensor time information based on information received from the sensor apparatus while the image data is being captured.

(6) The information processing system of (5), wherein the information received from the sensor apparatus is metadata associated with the image data.

(7) The information processing system of any of (1) to (6), wherein the circuitry is configured to adjust a fixed-value deviation between the plurality of time points of the image data and the plurality of time points of the event information based on the sensor time information at at least one time point.

(8) The information processing system of any of (1) to (7), wherein the circuitry is configured to adjust a linear deviation between the plurality of time points of the image data and the plurality of time points event information based on the sensor time information at at least two time points.

(9) The information processing system of any of (1) to (8), wherein the circuitry is configured to associate the plurality of time points of the image data and the plurality of time points of the event information by comparing a time of occurrence of a first event group detected in the image data with a time of occurrence of a second event group defined by the event information.

(10) The information processing system of (9), wherein the circuitry is configured to set parameters for modifying the plurality of time points of the event information to obtain a highest correlation between the time of occurrence of the first event group and the time of occurrence of the second event group.

(11) The information processing system of (10), wherein the circuitry is configured to set the parameters for modifying the plurality of time points of the event information by at least one of offsetting and changing a length of the plurality of time points of the event information.

(12) The information processing system of any of (1) to (11), wherein the sensor time information indicates a time in the sensor apparatus at a time point while the image data is being captured.

(13) The information processing system of any of (1) to (12), wherein the system comprises: the sensor apparatus configured to acquire the sensor information in time series and execute a predetermined operation coinciding with a time; and an imaging apparatus including the circuitry.

(14) The information processing system of any of (1) to (13), further including: a server including circuitry configured to perform the associating.

(15) A non-transitory computer-readable recording medium having a program recorded thereon, the program causing a computer to: acquire captured image data of a subject; and associate a plurality of time points of the image data and a plurality of time points of event information based on sensor time information, the event information acquired based on sensor information acquired in time series by a sensor apparatus and indicating occurrence of an event in an action of the subject.

(16) An information processing system including: circuitry configured to acquire first image data of a subject and a second image data of the subject; and associate a plurality of time points of the first image data and a plurality of time points of the second image data by comparing a time of occurrence of a first event group detected in the first image data with a time of occurrence of a second event group detected in the second image data.

(17) The information processing system of (16), further including: a first image capturing apparatus configured to capture the first image data of the subject.

(18). The information processing system of (16) or (17), further including: a second image capturing apparatus configured to capture the second image data.

(19) The information processing system of any of (16) to (18), further including: a server including circuitry configured to perform the associating.

(20) An information processing apparatus including:
an image acquisition unit configured to acquire a captured image of a subject; and
an adjustment control unit configured to make an adjustment between a time series of the image and a time series of event information based on sensor time information, the event information being acquired by analyzing sensor information acquired in time series by a sensor apparatus attached to the subject, the event information indicating occurrence of an event in an action of the subject, the sensor time information indicating a time in the sensor apparatus at at least one time point while the image is being captured.

(21) The information processing apparatus according to (20),
wherein the adjustment control unit acquires the sensor time information based on a predetermined operation executed by the sensor apparatus and detected by analyzing the image.

(22) The information processing apparatus according to (21),
wherein the predetermined operation indicates a time defined by a clock of the sensor apparatus.

(23) The information processing apparatus according to (21),
wherein the predetermined operation indicates that the occurrence of the event is detected in the sensor apparatus.

(24) The information processing apparatus according to (23),
wherein the adjustment control unit acquires the sensor time information, based on information received from the sensor apparatus while the image is being captured.

(25) The information processing apparatus according to (24),
wherein the information received from the sensor apparatus is recorded as metadata of the image.

(26) The information processing apparatus according to any one of (20) to (25),
wherein the adjustment control unit adjusts a fixed-value deviation between the time series of the image and the time series of the event information based on the sensor time information at at least one time point.

(27) The information processing apparatus according to any one of (20) to (26),
wherein the adjustment control unit adjusts a linear deviation between the time series of the image and the time series of the event information based on the sensor time information at at least two time points.

(28) The information processing apparatus according to (20),
wherein the adjustment control unit makes the adjustment between the time series of the image and the time series of the event information by comparing a time of occurrence of a first event group detected by analyzing the image with a time of occurrence of a second event group defined by the event information.

(29) The information processing apparatus according to (28),
wherein the adjustment control unit sets parameters for offsetting and changing a length of the time series of the event information to obtain a highest correlation between the time of occurrence of the first event group and the time of occurrence of the second event group.

(30) A non-transitory computer-readable recording medium having a program recorded thereon, the program causing a computer to implement:
a function of acquiring a captured image of a subject; and
a function of making an adjustment between a time series of the image and a time series of event information based on sensor time information, the event information being acquired by analyzing sensor information acquired in time series by a sensor apparatus attached to the subject, the event information indicating occurrence of an event in an action of the subject, the sensor time information indicating a time in the sensor apparatus at at least one time point while the image is being captured.

(31) An information processing system including:
a sensor apparatus attached to a subject and configured to acquire sensor information in time series and to execute a predetermined operation of indicating a time; and
an imaging apparatus including
an image acquisition unit configured to acquire a captured image of a subject, and
an adjustment control unit configured to make an adjustment between a time series of the image and a time series of event information based on sensor time information, the event information being acquired by analyzing the sensor information, the event information indicating occurrence of an event in an action of the subject, the sensor time information being acquired based on the predetermined operation executed at at least one time point while the image is being captured.

(32) An information processing apparatus including:
an image acquisition unit configured to acquire a captured image of a subject; and
an adjustment control unit configured to make an adjustment between a time series of the image and a time series of another captured image of the subject,
wherein the adjustment control unit makes the adjustment between the time series of the image and the time series of the other image by comparing a time of occurrence of a first event group detected by analyzing the image with a time of occurrence of a second event group detected by analyzing the other image.

What is claimed is:

1. An information processing system comprising:
    circuitry configured to
        acquire captured image data of a subject;
        associate a plurality of time points of the image data and a plurality of time points of event information based on sensor time information, the event information acquired based on sensor information including motion information of the subject and acquired in time series by a sensor apparatus attached to the subject and indicating occurrence of an operation of the sensor apparatus;
        correct a time deviation between the image data and the event information, the time deviation being a deviation between a time in the image data and a time in the event information corresponding to a single real-world time; and
        generate a digest image based on the event information.

2. The information processing system according to claim 1, wherein
    the circuitry is configured to acquire the sensor time information based on a predetermined operation of the sensor apparatus that is detected in the image data.

3. The information processing system according to claim 2, wherein
    the predetermined operation coincides with a time defined by a clock of the sensor apparatus.

4. The information processing system according to claim 2, wherein
    the predetermined operation indicates that the occurrence of an event is detected by the sensor apparatus.

5. The information processing system according to claim 1, wherein
    the circuitry is configured to acquire the sensor time information based on information received from the sensor apparatus while the image data is being captured.

6. The information processing system according to claim 5, wherein
    the information received from the sensor apparatus is metadata associated with the image data.

7. The information processing system according to claim 1, wherein
    the circuitry is configured to correct the time deviation by adjusting a fixed-value deviation between the plurality of time points of the image data and the plurality of time points of the event information based on the sensor time information at at least one time point.

8. The information processing system according to claim 1, wherein
    the circuitry is configured to correct the time deviation by adjusting a linear deviation between the plurality of time points of the image data and the plurality of time points event information based on the sensor time information at at least two time points.

9. The information processing system according to claim 1, wherein
    the circuitry is configured to correct the time deviation by adjusting the plurality of time points of the image data and the plurality of time points of the event information by comparing a time of occurrence of a first event group detected in the image data with a time of occurrence of a second event group defined by the event information.

10. The information processing system according to claim 9, wherein
    the circuitry is configured to set parameters for modifying the plurality of time points of the event information to obtain a highest correlation between the time of occurrence of the first event group and the time of occurrence of the second event group.

11. The information processing system according to claim 10, wherein
    the circuitry is configured to set the parameters for modifying the plurality of time points of the event information by at least one of offsetting and changing a length of the plurality of time points of the event information.

12. The information processing system according to claim 1, wherein
    the sensor time information indicates a time in the sensor apparatus at a time point while the image data is being captured.

13. The information processing system according to claim 1, wherein the system comprises:
    the sensor apparatus configured to acquire the sensor information in time series and execute a predetermined operation coinciding with a time; and
    an imaging apparatus including the circuitry.

14. The information processing system according to claim 1, further comprising:
    a server including circuitry configured to perform the associating.

15. The information processing system according to claim 1, wherein
    the digest image includes a scene of an event designated by a user.

16. A non-transitory computer-readable recording medium having a program recorded thereon, the program causing a computer to:
    acquire captured image data of a subject;
    associate a plurality of time points of the image data and a plurality of time points of event information based on sensor time information, the event information acquired based on sensor information including motion information of the subject and acquired in time series by a sensor apparatus attached to the subject and indicating occurrence of an event in an action of the subject;
    correct a time deviation between the image data and the event information, the time deviation being a deviation between a time in the imaae data and a time in the event information corresponding to a single real-world time; and
    generate a digest image based on the event information.

17. The non-transitory computer-readable recording medium according to claim 16, wherein
    the digest image includes a scene of an event designated by a user.

18. An information processing system comprising:
circuitry configured to
  acquire captured image data of a subject;
  store the captured image data of the subject in association with a plurality of time stamps of the image data;
  receive sensor information acquired in time series by a sensor apparatus attached to the subject and indicating occurrence of an operation of the sensor apparatus;
  associate a plurality of the time stamps of the image data and a plurality of time stamps of event information based on sensor time information, the event information acquired based on the sensor information;
  correct a time deviation between the image data and the event information, the time deviation being a deviation between a time in the image data and a time in the event information corresponding to a single real-world time; and
  generate a digest image based on the event information.

19. The information processing system of claim 18, further comprising:
  a communication interface configured to receive the sensor information from the sensor apparatus.

20. The information processing system of claim 19, wherein
  the communication interface is a wireless communication interface configured to communicate directly with the sensor apparatus.

21. The information processing system of claim 18, wherein
  the circuitry is configured to transmit an instruction to activate the sensor apparatus upon the initiation of capturing the image data of the subject.

22. The information processing system of claim 18, wherein
  the information processing system is an imaging apparatus including a wireless interface configured to communicate with the sensory apparatus.

23. The information processing system according to claim 18, wherein
  the digest image includes a scene of an event designated by a user.

* * * * *